United States Patent
Nakashige et al.

(10) Patent No.: US 7,342,679 B2
(45) Date of Patent: Mar. 11, 2008

(54) IMAGE EVALUATION APPARATUS AND METHOD

(75) Inventors: Fumihiro Nakashige, Kanagawa (JP); Mitsumasa Nomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 967 days.

(21) Appl. No.: 10/614,818

(22) Filed: Jul. 9, 2003

(65) Prior Publication Data

US 2004/0012819 A1 Jan. 22, 2004

(30) Foreign Application Priority Data

Jul. 16, 2002 (JP) .............................. 2002-207565

(51) Int. Cl.
*G06K 15/02* (2006.01)
*G06F 15/00* (2006.01)

(52) U.S. Cl. ........................................ 358/1.2; 358/1.9

(58) Field of Classification Search ................ 358/1.9, 358/1.6, 1.2, 1.1, 1.5, 1.12, 1.18, 3.11, 3.12, 358/538, 528, 3.1, 3.13, 1.7, 1.8, 474, 475, 358/461, 465, 466, 468, 3.07, 3.09, 3.27, 358/1.11, 530, 532, 3.26; 382/113, 298, 382/299; 347/1, 2, 3, 5
See application file for complete search history.

(56) References Cited

U.S. PATENT DOCUMENTS 5,821,957 A * 10/1998 Berge et al. .................. 347/43

7,058,232 B1 * 6/2006 Miyake ....................... 382/252
2002/0008730 A1 * 1/2002 Mitsuzawa .................... 347/40

FOREIGN PATENT DOCUMENTS

| JP | 7-175933 | 7/1995 |
| JP | 9-233235 | 9/1997 |
| JP | 11-39486 | 2/1999 |
| JP | 2001-74602 | 3/2001 |
| JP | 2001-291107 | 10/2001 |

* cited by examiner

*Primary Examiner*—Dov Popovici
(74) *Attorney, Agent, or Firm*—Oblon, Spivak, McClelland, Maier & Neustadt, P.C.

(57) ABSTRACT

An image evaluation program is implemented in an image evaluation apparatus to evaluate a dot of an image that is reproduced on a support medium by an imaging apparatus and formed by a plurality of dots having a predetermined dimension arranged in a main scanning direction and a sub scanning direction. The image evaluation apparatus produces image signals at a resolution at least twice as high as a dot resolution of the image, and the image evaluation program is arranged to measure a dot position of each dot in the image.

11 Claims, 25 Drawing Sheets

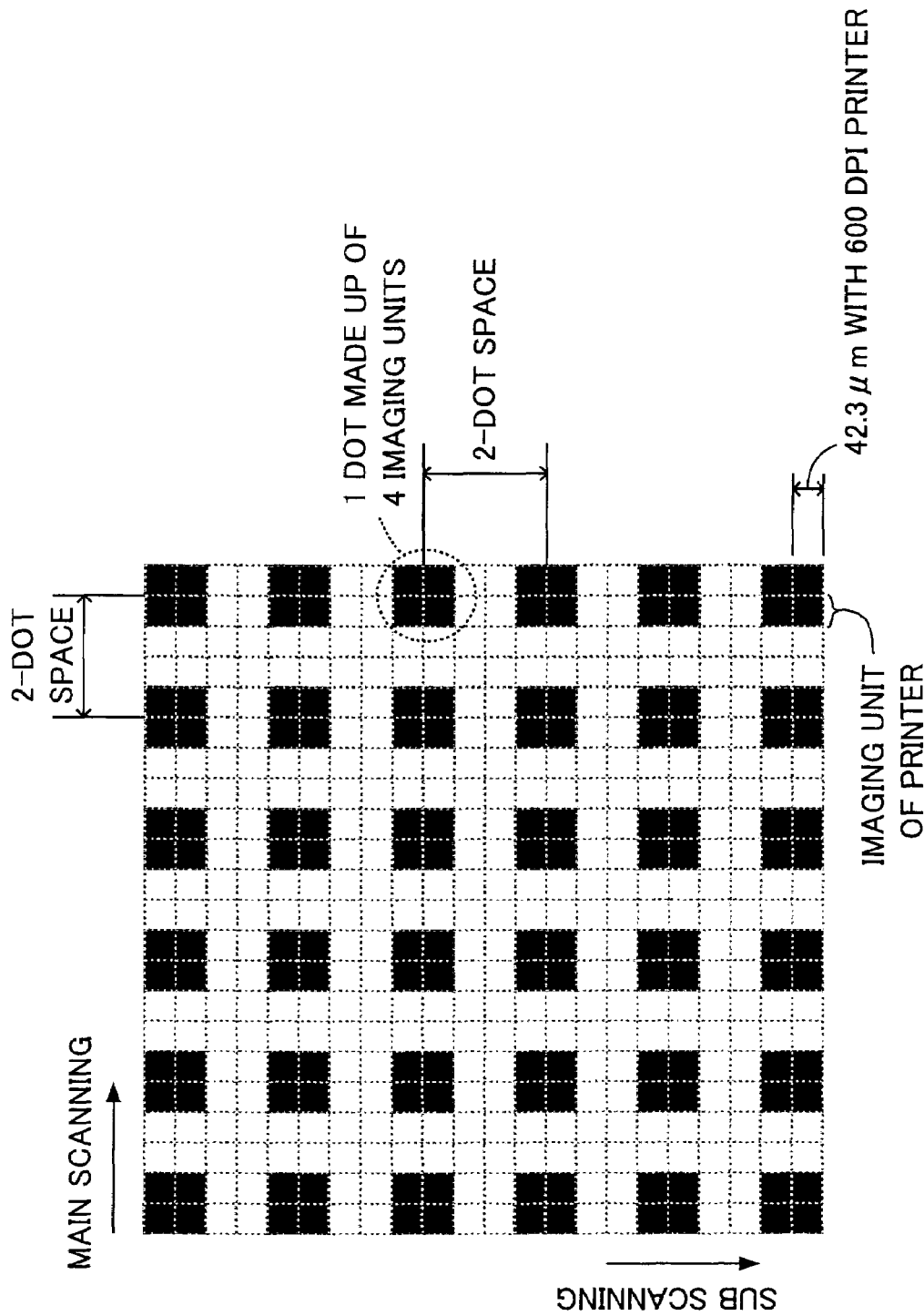

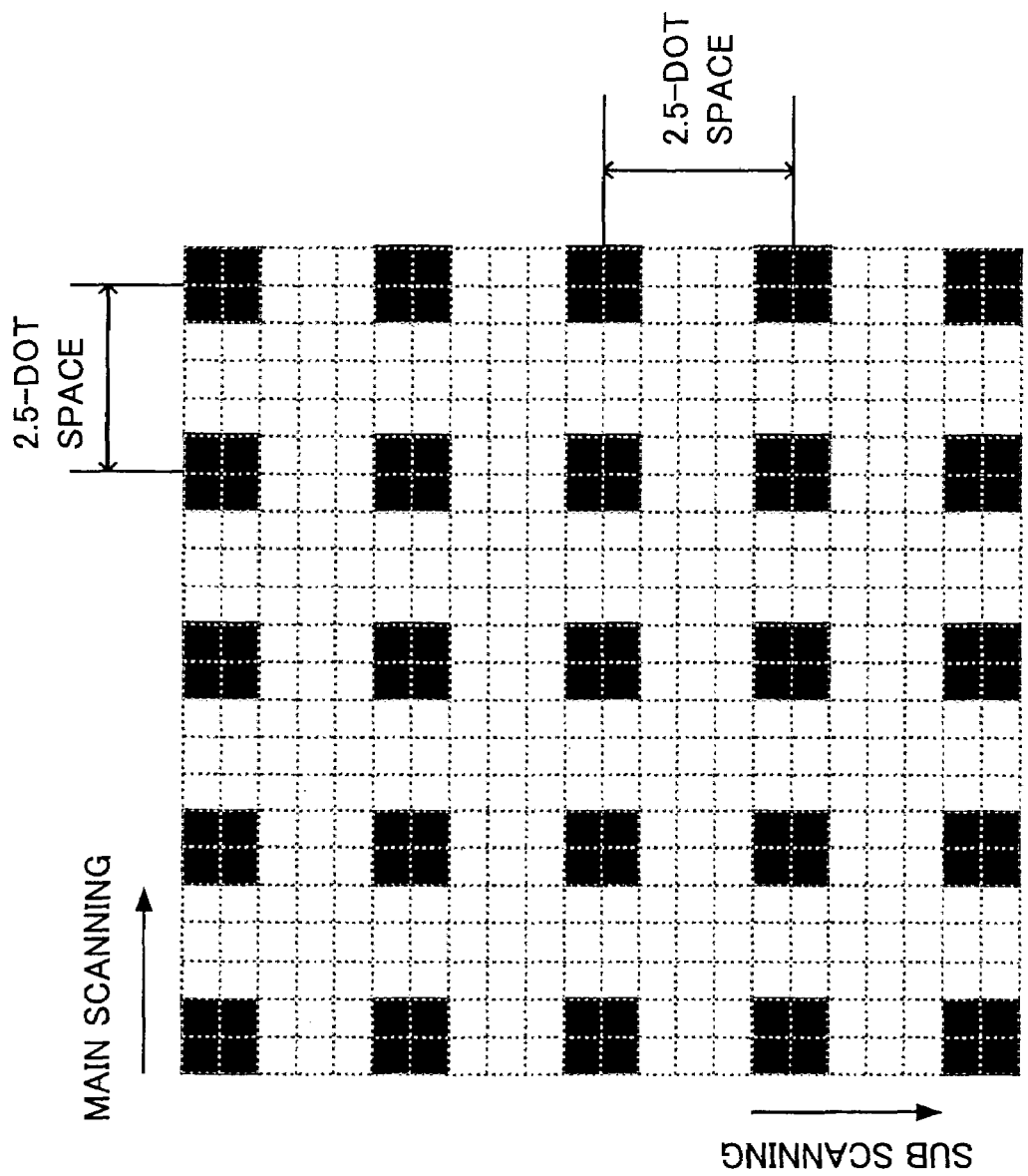

IMAGE EVALUATION APPARATUS AND METHOD

BACKGROUND OF THE INVENTION

1. Field of the Invention

The present invention relates generally to an apparatus and method for accurately measuring and examining dot position deviation and dot density fluctuation in a sub scanning direction of a printed image in order to evaluate printer performance. Particularly, the present invention relates to a technique for detecting cyclic fluctuation of a variation in dot position and cyclic fluctuation of a variation in dot size generated in a sub scanning operation performed by an imaging apparatus such as an electrophotographic printer that forms a two-dimensional image by generating a one-dimensional dot line extending in a horizontal (main scanning) direction and successively repeating the dot line formation in a vertical (sub scanning) direction.

2. Description of the Related Art

Prior art publications relating to the present invention are disclosed in Japanese Patent Laid-Open Publication No.7-175933 ("Image Evaluation Method and Apparatus"), Japanese Patent Laid-Open No.9-233235 ("Image Evaluation Method and Imaging Apparatus Using the Same"), and Japanese Patent Laid-Open Publication No.2001-74602 ("Image Evaluation Apparatus and Image Evaluation Method"), for example. In the printed image evaluation performed according to these publications, a dot position (deviation) of the image is evaluated using either adjacent dot patterns or line patterns.

Also, in Japanese Patent Laid-Open Publication No.11-039486 ("Image Quality Evaluation Method"), a technique for detecting dot density fluctuation with respect to the sub scanning direction (banding) in a printed image based on a scanned image of the printed image obtained by a scanner, for example, is disclosed. According to this publication, the print pattern used in the image evaluation may be a 2-by-2 pattern (dot pattern in which dots are laid out at 2-dot intervals both in the horizontal and vertical direction), for example, as shown in FIG. 1. It is noted that a maximum dot density can be achieved by using this print pattern. Alternatively, the density fluctuation may be detected by calculating the brightness within a region having a predetermined width in the main scanning direction and a height of one dot in the sub scanning direction, this process being successively performed in the sub scanning direction.

In this prior art method, the following problems exist.

The first problem is that it cannot be discerned whether the detected banding is due to dot size fluctuation or dot position deviation.

In the imaging apparatus being evaluated, the unevenness in dot density with respect to the sub scanning direction (banding) in the printed image can be caused by either dot size fluctuation or dot position deviation. The differentiation of these two factors will be important in specifying the cause of the banding. However, it is difficult to differentiate the two factors when the space between the dots is too narrow; that is, owing to the characteristics of the imaging apparatus being evaluated, when the dots are arranged too close to each other, the dots tend to influence each other, and as a result, the dot size increases (dot size fluctuation) and the dot space is narrowed as well (dot position deviation).

FIGS. 2A and 2B are diagrams illustrating the relationship between the dot space and the dot size obtained from an image produced according to a laser electrophotographic method. In a case where the laser beam irradiation pitch is 169 µm (FIG. 2A), the space between the imaged dots is 169 µm, which is the same as the laser beam irradiation pitch (dot pitch designated by the dot pattern). However, when the laser beam irradiation pitch is 160 µm (FIG. 2B), the space between the imaged dots is 150 µm, and the dot size increases as well. In FIG. 2B, the dot space is 19 µm narrower than that of FIG. 2A. This is because the electrical charges of the dots influence each other when the dot pitch for imaging the dots with the laser beam is so narrow, resulting in the dots of the printed image being enlarged. Further, the dots expand in the directions that narrow the space between the imaged dots, resulting in dot position deviation.

Another problem is that when the dots of the printed image are formed by a 2-by-2 pattern configuration (see FIG. 1), the detection of the dot density fluctuation cycle in the sub scanning direction in the image evaluation can only be detected in units no smaller than four imaging units. This is because the dots are arranged into patterns each with a density of four imaging units in the sub scanning direction.

If the dots are formed with a pattern density of one imaging unit in the sub scanning direction, a more precise analysis of the imaging apparatus can be realized since the density fluctuation cycle can be detected with respect to the smallest imaging unit and all the high-frequency position deviation oscillation components can be detected. However, if such a pattern is used, the dots will be continuous (there will be no space between the dots), and it will be impossible to detect the dots as one single dot.

A second problem is that in measuring the dots of a printed image formed by numerous dots laid out in a predetermined pattern, if each dot is detected and measured individually, a significant amount of time is needed in detecting all of the dots, and further, dust particles or stains, for example, on the reproduced image may be mistakenly detected as a dot, resulting in a measurement error.

A third problem is that there will be some position deviation in the reproduced image with respect to the print pattern. For example, the image magnification may be varied, or the reproduced image may be skewed due to the slanting of the image upon being printed on the support medium (paper) Also, the support medium may expand or contract after the image is printed out. Thus, the dot spacing of the printed image may not necessarily correspond exactly to the print pattern (dot pitch). This may cause errors in the image measurement, especially in the dot position measurement.

A fourth problem is that upon inputting the reproduced image into an image input apparatus, especially in the case of using a scanner, unevenness in density caused by an inconsistency in the distribution of irradiation light for reading the reproduced image may be a factor influencing the image evaluation, and the dot size of the imaged dot may be prevented from being accurately measured.

SUMMARY OF THE INVENTION

The present invention has been developed in response to the problems of the related art as described above, and its objects are described below.

First, it is an object of the present invention to arrange the reproduced image that is to be evaluated so that it can be discerned whether the detected banding is caused by a variation in dot size, or a variation in dot position.

Second, in a printed image, oftentimes, an alien substance is stuck to the printed image and dots other than those intended to be detected may also be detected. The alien substance is referred to as dust hereinafter. When dust is placed on the reproduced image, this may mistakenly be detected as a dot of the reproduced image. As a result, the accuracy in the image evaluation may be degraded, and in some cases, measurement may be impossible. Thus, it is another object of the present invention to reduce the influences from dust particles placed on the reproduced image in performing the image evaluation and to realize high-speed detection of the dots.

Third, in reproducing an image based on the print pattern, the dots are ideally reproduced at positions designated by the print pattern. However, it is known that defects other than the dot position deviation being measured in the image evaluation also exist, such as the deviation in the image magnification due to the expansion or contraction of the support medium (paper) of the reproduced image, or a skew generated due to the slanting of the reproduced image with respect to the ideal position. These effects occur consistently throughout the entire image, and the dot position deviation due to these effects is sustained by the entire image. Thus, for example, the relative positioning of the dots at the front end of the reproduced image and the rear end of the reproduced image is greatly influenced by the above described magnification error in the reproduced image. In a case where the reproduced image sustaining such error is used in the dot position measurement, when one dot is detected and a next dot is to be detected, for example, the next dot may be deviated even further than the expected dot position deviation and it may be impossible to detect the dot position. Thus, it is a further object of the present invention to eliminate the influences from image magnification errors and skews generated in the reproduced image.

Fourth, in an image input apparatus used for reading the reproduced image and obtaining image signals from the reproduced image, even when the image density of the reproduced image is fixed, the corresponding image signals obtained at the image input apparatus will not necessarily be at the same level unless the irradiation light, irradiated on the reproduced image by a lighting apparatus that is implemented in the image input apparatus, is consistent regardless of the reading position. This is particularly a problem in measuring the dot size. Thus, it is another object of the present invention to eliminate the influences from the unevenness in dot density reading caused by an inconsistency in the distribution of irradiation light, for example, that occurs upon inputting the reproduced image into an image input apparatus.

To realize the first object, the present invention provides an image evaluation method for evaluating a dot in an image produced by an imaging apparatus that forms a two-dimensional image on a support medium such as paper, the image being formed by a plurality of dots having a predetermined dimension arranged in a main scanning direction and a sub scanning direction at predetermined pitches of at least 2.5 times the predetermined dimension of the dots, the method including the step of:

evaluating a dot position deviation in the sub scanning direction by measuring a dot position of each dot in the image.

The image formed by dots arranged in the main scanning direction and the sub scanning direction at dot pitches of at least 2.5 times the predetermined dimension of the dots is generated by printing the dots in the main scanning direction at intervals of at least 2.5 times the dot dimension.

Also, with regard to the design standard value, which designates the dot diameter to be 120 µm, when the dot pitch is 2 times the designated dot dimension, the adjacent dots interfere with each other and the diameter of the printed dots reach a value close to 140 µm. However, when the dot pitch is 2.5 times the designated dot dimension, the diameter of the printed dots will be 120-125 µm, which is within a permissible error range of the design standard value. Thus, if the dot pitch is at least 2.5 times the designated dot dimension, influences from mutual interferences between the dots can be eliminated.

By arranging the dot pitch in both the main scanning direction and the sub scanning direction to be at least 2.5 times the dot dimension, the mutual interference between the adjacent dots in the respective scanning directions can be eliminated so that dot position deviation due to the influence from this mutual interference can be prevented. Thus, only the dot position deviation as a result of an error in the printing system is detected as the 'dot position deviation'.

It is noted that the dot pitch is preferably arranged to be the minimum value within the range suitable for the relevant imaging operation so that optimum image evaluation performance can be realized.

Also, since the optimum dot pitch varies depending on the design standard value and/or the intensity of the light beam, there is no particular significance in setting the value 2.5 as the minimum dot pitch. Rather, the present invention emphasizes the concept that the dot pitch is preferably arranged to be a minimum pitch that can maintain the variation of the dot diameter within a permissible error range for a particular design standard value.

Additionally, when the dots of the print pattern has a 2×2 configuration, the dot pitch can only be adjusted in units of 0.5 times the dot dimension, and thus, a dot pitch of 2.3 times the dot dimension cannot be realized in this case. However, if the dots of the print pattern has a 5×5 configuration, the dot pitch can be adjusted in units of 0.2 times the dot dimension. In this case, the minimum pitch that can maintain the diameter of the printed dot within a permissible error range for the design standard value of a particular imaging apparatus can be obtained through changing the dot pitch in units of 0.2 times the dot dimension.

To realize the second object, the present invention provides an image evaluation method for evaluating a dot position deviation in an image produced by an imaging apparatus that forms a two-dimensional image on a support medium such as paper, the image being formed by a plurality of dots having a predetermined dimension arranged in a main scanning direction and a sub scanning direction at predetermined pitches, wherein the dot position deviation in the sub scanning direction is evaluated by detecting a dot position of each dot based on image signals obtained by an image input apparatus that is arranged to read the image. Specifically, dot positions of a plurality of dots arranged on a dot line in the main scanning direction are detected in one dot position measurement process based on the image signals obtained by the image input apparatus and the predetermined pitch in the main scanning direction. The dot line (position) is determined by successively detecting and accumulating image signals corresponding to a plurality of dot detection positions of the image. That is, a dot detection start position is selected within a designated portion of the image, and the image signal value corresponding to this position is obtained. Then, the image signal value of a next dot detection position shifted from the dot detection start position at the predetermined pitch is obtained and accumulated. In this way, image signals for a designated number of detection positions are obtained, and an accumulation value of the obtained image signal values is calculated. Then another detection start position is selected and the image signal detection and accumulation process is successively repeated. If the dot detection start position is correct (on the dot), all the detection positions will be on the dot and the accumulation value of the image signals will take a minimum value (provided that the dot portion image signal value is less than the support medium portion image signal value). Thus, the dot detection positions with the minimum accumulation value are arranged to be the dot line position.

This measurement process is successively performed to detect a next dot line in the sub scanning direction so that each dot position of the reproduced image is detected.

According to this method, the dot detection is performed on a line of dots arranged at a predetermined pitch in the main scanning direction. By detecting a plurality of dots at once, the measurement process can be quickened. Also, the dot position deviation in the sub scanning direction of the imaging apparatus can be evaluated without being influenced by dust particles, for example, on the reproduced image. This is because, it is very unlikely that a plurality of dust particles appear on the reproduced image at a predetermined pitch, and thereby, erroneous detection of dots can be prevented.

To realize the third object, the present invention provides the above described image evaluation method for realizing the second object in which all dots of a dot line in the main scanning direction are detected and accumulated at once, wherein the dot pitch and the direction (slope) of the dot line, which are used in detecting the dot position, are varied within a predetermined range.

This arrangement is effective owing to the fact that the dot position deviation due to magnification errors or image skewing is a fluctuation occurring consistently throughout the entire image (i.e., the fluctuation does not occur at one particular region of the image). Thus, in an image formed by dots of a predetermined size arranged at predetermined pitches, even when magnification errors or skews are generated, the dot pitches will be maintained consistent throughout the entire image. However, it is noted that when a magnification error occurs, the dot pitch value changes, and when a skew is generated, the dot line that is ideally parallel to the main scanning direction is slanted toward the sub scanning direction. Thus, the dots of the dot line in the main scanning direction cannot be detected using the second image evaluation method. That is, even if the dot detection start position is correct and a first dot is detected, the subsequent dots will not be detected using the predetermined pitch. However, in this third image evaluation method, the dot line is detected by varying the pattern detection conditions such as the dot pitch or the dot line direction that are used for detecting the dot position. Thus, this method enables the accurate detection of dots even in a case where magnification errors or skews are generated.

To realize the fourth object, the present invention provides an image evaluation method for measuring a dot size of an image produced by an imaging apparatus that forms a two-dimensional image on a support medium such as paper, said image being formed by a plurality of dots having a predetermined size arranged in a main scanning direction and a sub scanning direction at predetermined pitches, wherein an image input apparatus such as a scanner is arranged to read the image and measure the dot size based on image signals read out by the image input apparatus. Specifically, the dot portion data of the image signals obtained by reading the reproduced image are corrected using image signals obtained from reading a consistent image with a fixed density (base image signal), or image signals of the support medium (paper) portion surrounding the dot of the reproduced image.

According to this arrangement, the influences from unevenness in the density of the read out image caused by an inconsistency in the distribution of the irradiation light irradiated from the image input apparatus upon inputting the image to the input apparatus can be eliminated. As for the correction method, the read out image signals of the reproduced image may be subtracted from the base image, for example.

The signal levels of the image signals obtained from reading a consistent image with a fixed density (base image signal), and image signals of the support medium (paper) portion surrounding the dot of the reproduced image are supposedly fixed provided that the irradiation light irradiated on the reproduced image by the image input apparatus is consistent regardless of the reading position. When there is a fluctuation in the signal levels, this represents the unevenness in the read out density of the image input apparatus. To eliminate influences from this effect in the image evaluation, the image signals of the reproduced image can be subtracted from the image signals obtained by reading a consistent image with a fixed density. In this case, the image signal levels will be reversed; that is, the dot portion of the image is altered from black (0 bit) to white (255 bit).

BRIEF DESCRIPTION OF THE DRAWINGS

FIG. 1 shows an example of a print pattern used in a conventional image evaluation method;

FIG. 3 shows an example of a print pattern according to an embodiment of the present invention;

DESCRIPTION OF THE PREFERRED EMBODIMENTS

In the following, preferred embodiments of the present invention are described with reference to the accompanying drawings.

FIG. 3 shows a print pattern used in an embodiment of the present invention. This print pattern is made up of dots arranged in the main scanning direction and the sub scanning direction at dot pitches that are 2.5 times the designated dot dimension in the imaging apparatus being evaluated.

One dot is formed by 2×2 imaging units of the imaging apparatus. In this case, if the resolution of the imaging apparatus is 600 dpi, the dimension of one dot in the print pattern will be 84.6 μm. The dots are arranged to have a 2×2 configuration so that stability can be sufficiently maintained; that is, when the dots have a 1×1 configuration, the imaged dots are often unstable. It is noted that a stable dot configuration refers to a state in which each dot stands alone independently without sticking to adjacent dots.

Figure 8:
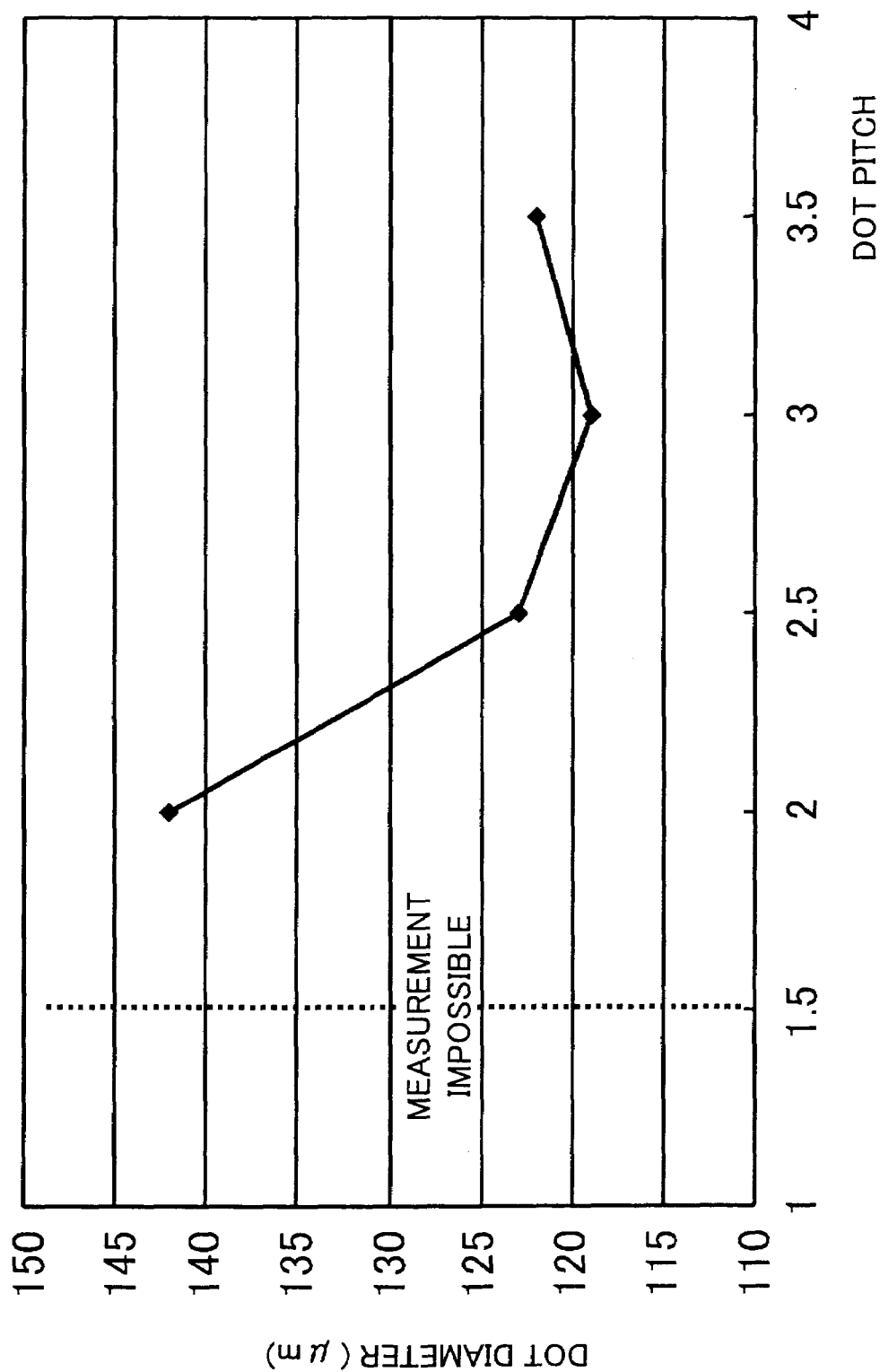
FIG. 8 is a graph showing a relationship between the dot pitch and the dot size.

The dot pitch is arranged to be 2.5 times the dot dimension so that each dot can stand alone independently without receiving influences from each other. When the resolution of the imaging apparatus is 600 dpi, and the dot pitch is 2.5 times the dot dimension, the diameter of the imaged dot will be within the error range of the design standard value 120 μm as is shown in FIG. 8. In this case, the interference from adjacent dots will not be generated.

Figure 2B:
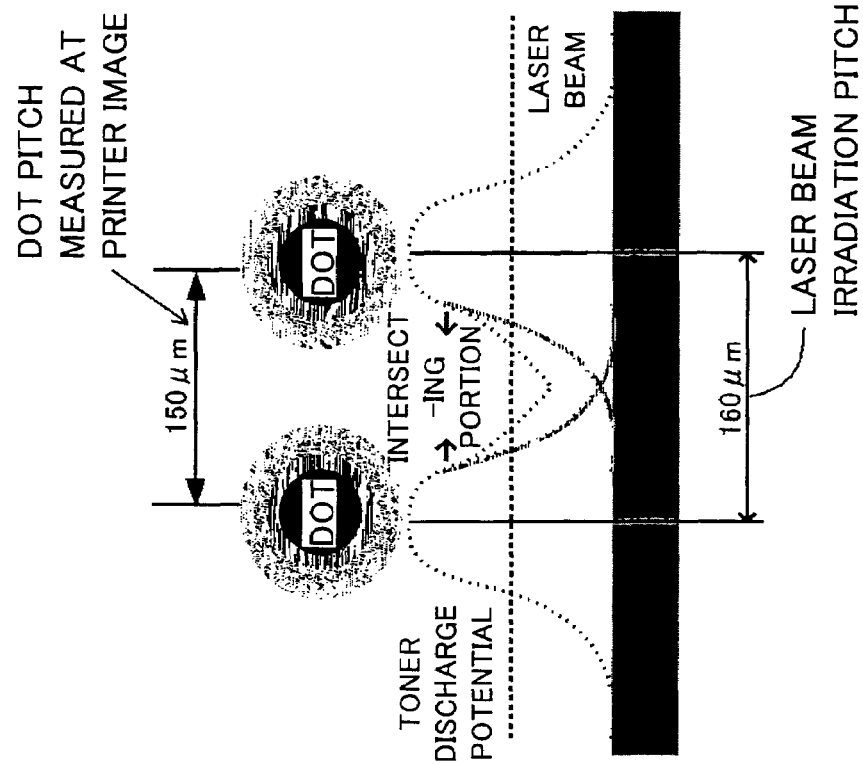
FIGS. 2A and 2B illustrate a problem in the conventional art relating to dot pitch.
Figure 2A:
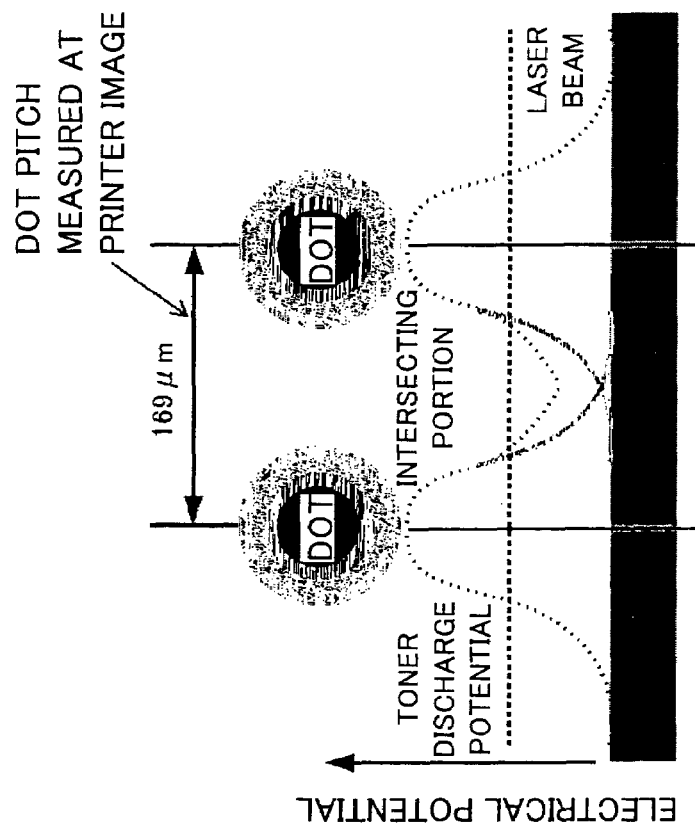
Figure 4:
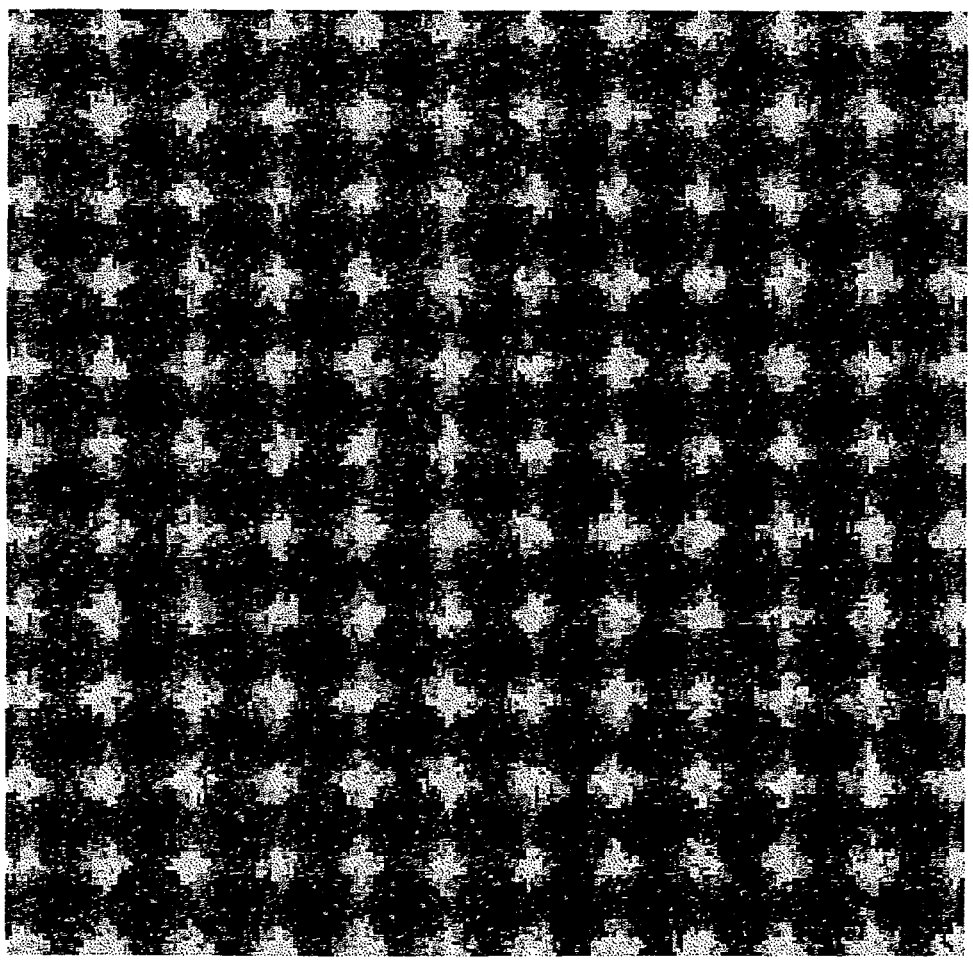
FIG. 4 shows an example of a print pattern image in which the dot pitch is 1.5 times the dot size.
Figure 5:
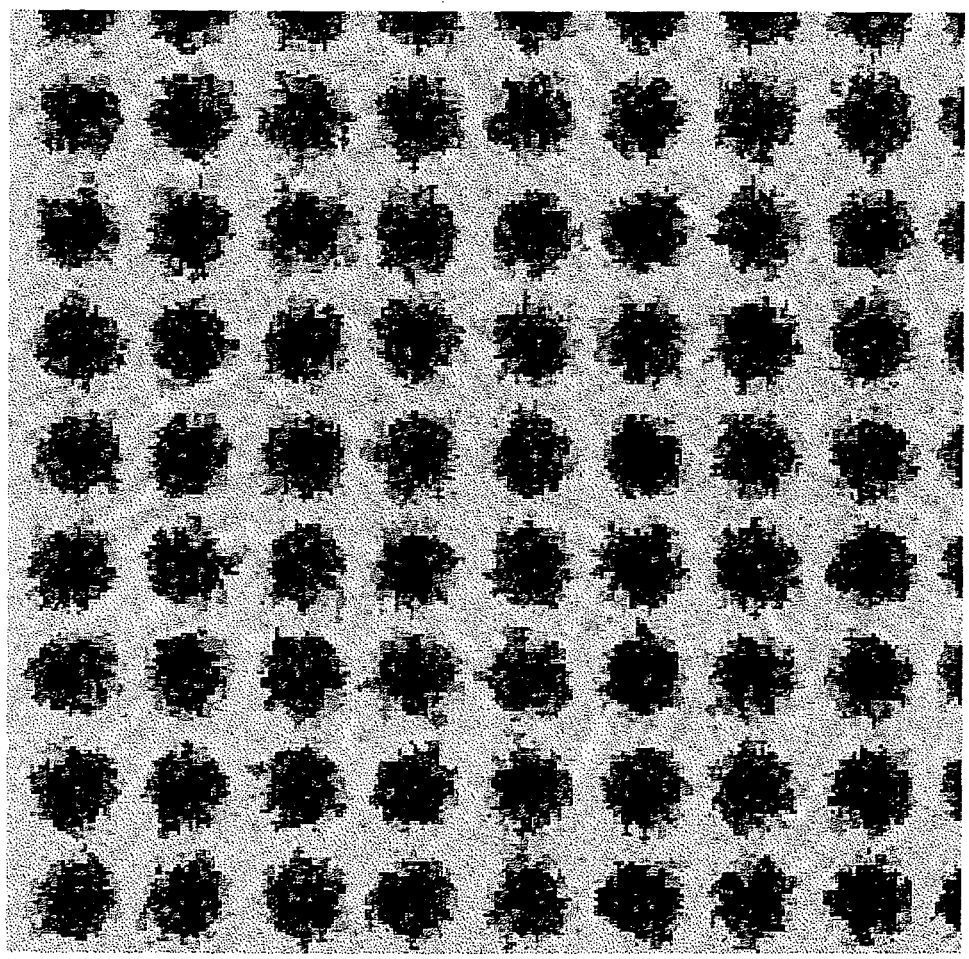
FIG. 5 shows an example of a print pattern image in which the dot pitch is 2 times the dot size.
Figure 6:
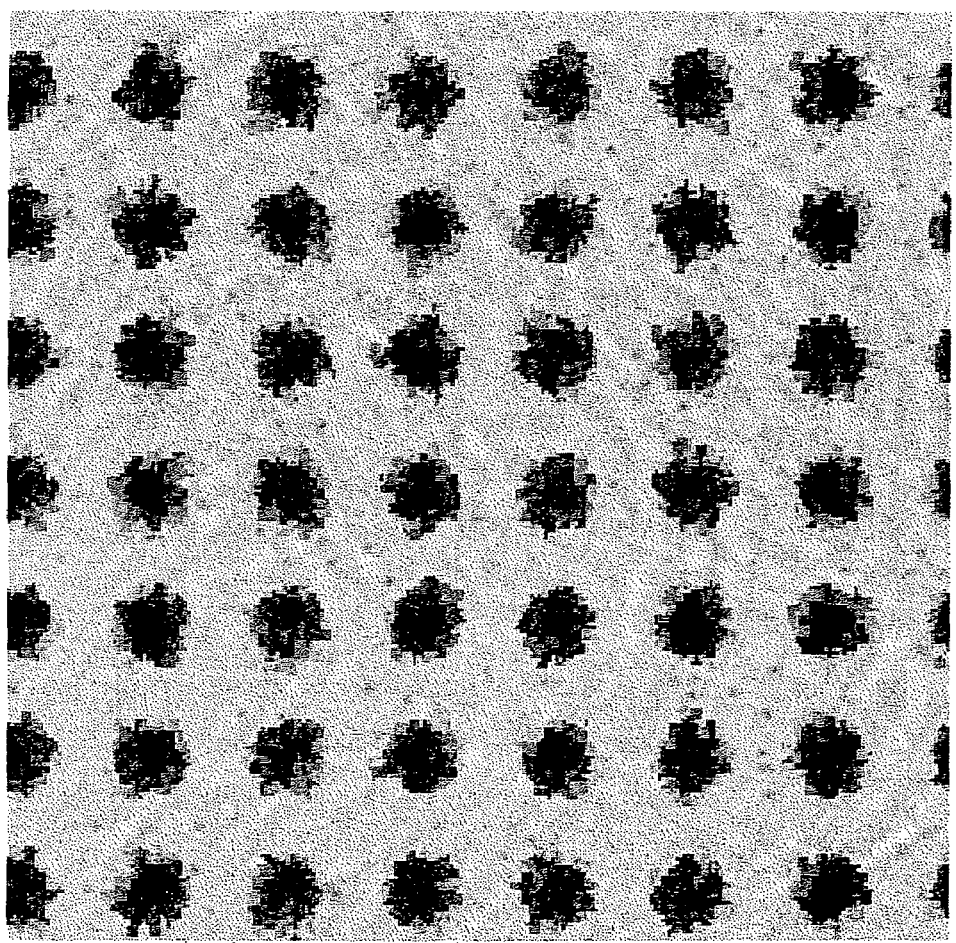
FIG. 6 shows an example of a print pattern image in which the dot pitch is 2.5 times the dot size.
Figure 7:
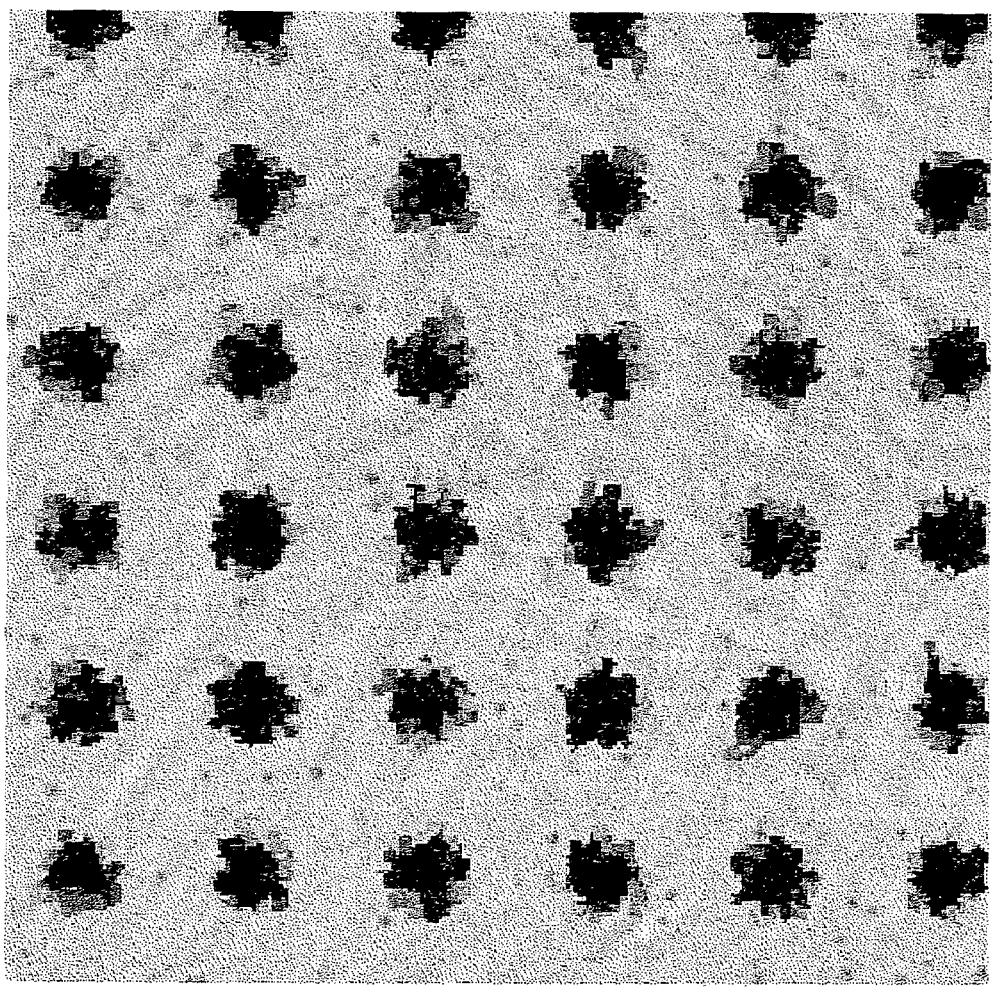
FIG. 7 shows an example of a print pattern image in which the dot pitch is 3 times the dot size.

FIGS. 4-7 show examples of different printed images reproducing print patterns with different dot pitches but the same dot dimension as that of FIG. 3, where the printed image is reproduced by an imaging apparatus with a resolution of 600 dpi. When the dot pitch is 1.5 times the dot dimension, as shown in FIG. 4, the adjacent dots greatly interfere with each other and the dot diameter of the imaged dot is widened so that the adjacent dots touch each other. When the dot pitch is 2 times the dot dimension, as shown in FIG. 5, the adjacent dots still interfere with each other and the dot diameter is slightly above the design standard value so that the independence of each dot is not completely obtained. When the dot pitch is 2.5 times the dot dimension, as shown in FIG. 6, the outline of the dot is distinct so that the independence of each dot can be secured. When the dot pitch is 3 times the dot size, as shown in FIG. 7, the outline of each dot is also distinct and the dots are independent from each other. FIG. 8 shows the relationship between the dot pitch and the dot diameter of the above four different print patterns.

According to the above description, when the resolution of the imaging apparatus is 600 dpi, the dot pitch needs to be set to at least 2.5 times the dot dimension in order to maintain complete independence of the dots. Also, a normal dot position deviation and dot size fluctuation in the imaging apparatus can be effectively detected with this dot pitch.

Figure 9:
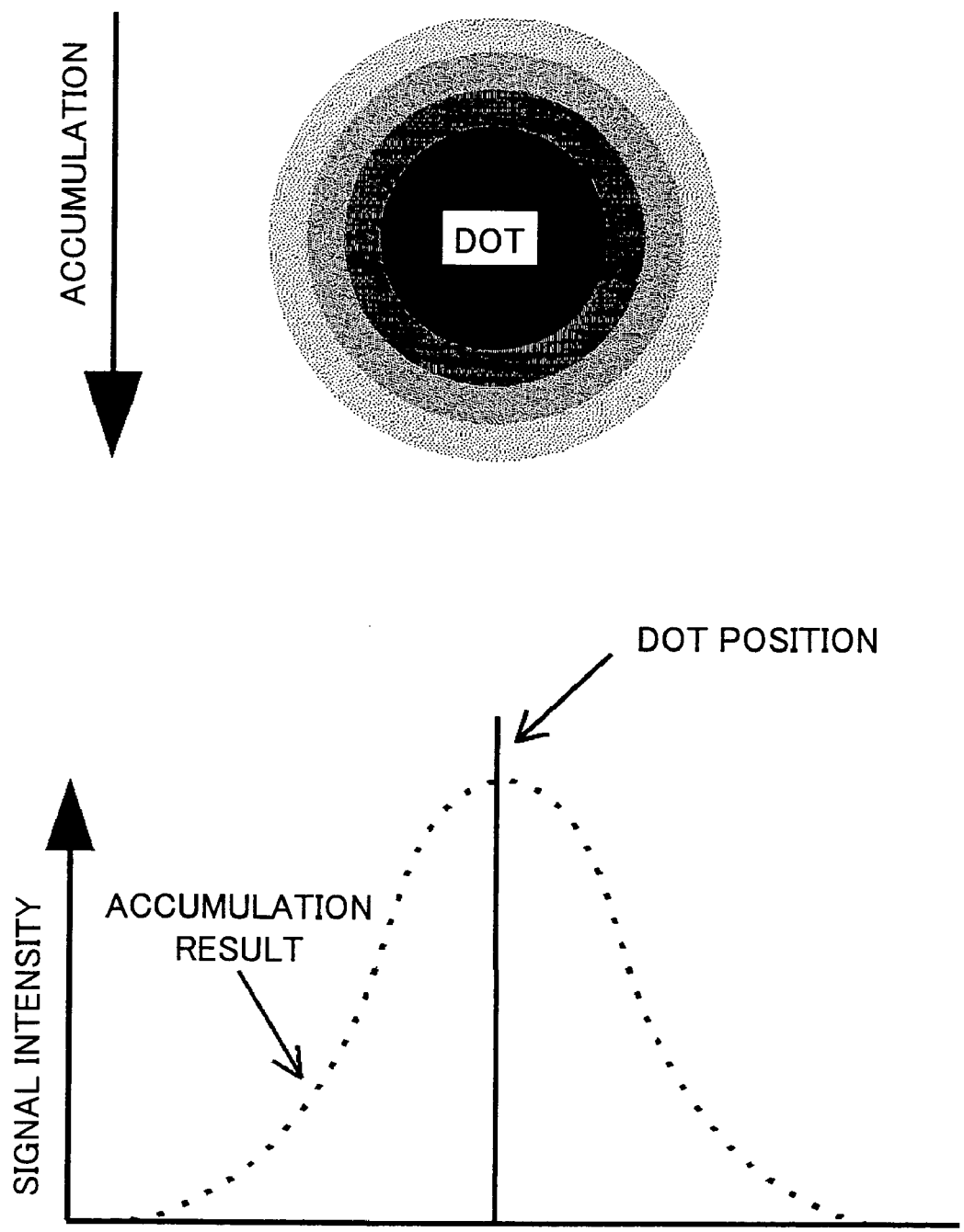
FIG. 9 is a conceptual image illustrating a measuring method of a dot position.
Figure 10:
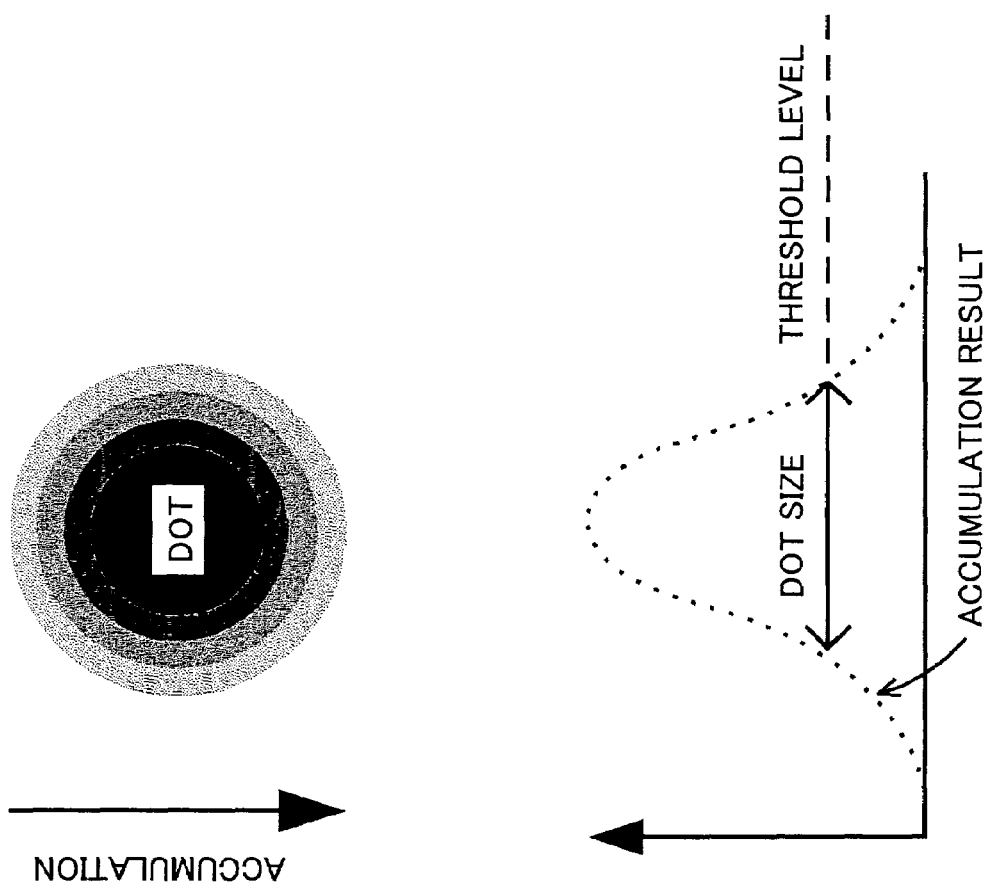
FIG. 10 is a conceptual image illustrating a measuring method of the dot size.

Thus, the dot position and the dot size of each dot in the printed image, reproduced at a resolution of 600 dpi and formed by a dot pattern with the dot pitch of 2.5 times the dot dimension, are detected. The dot position may be, for example, the peak position of the dot configuration or a peak position obtained from accumulating the data in one direction and finding the peak position from the accumulation result. FIG. 9 shows the relationship between the planar configuration of a dot and the accumulation result of accumulating the image signals of the same dot in one direction (signal intensity). Also, in this example, the width of the accumulation result at a designated threshold level is measured and this measurement is arranged to be the dot size (see FIG. 10).

By measuring the dot position and the dot size according to the above described manner, an evaluation can be made as to whether or not dot position deviation or dot size fluctuation occur in the imaging apparatus.

Figure 11:
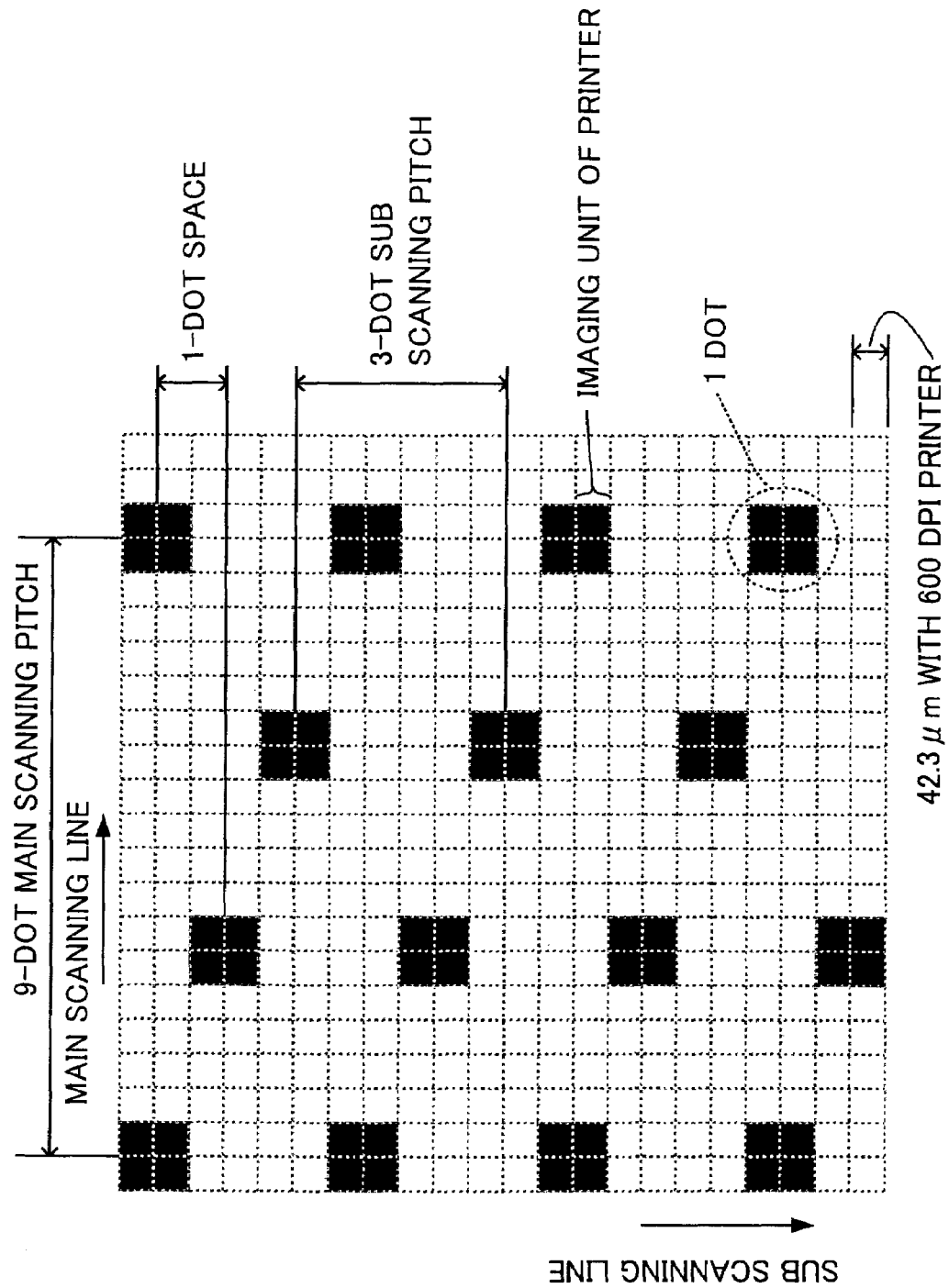
FIG. 11 shows an example of a print pattern according to another embodiment of the present invention.

FIG. 11 shows another example of a print pattern used in the image evaluation of the present invention. In this print pattern, the dot pitch in the main scanning direction is set to 9 times the dot dimension and the dot pitch in the sub scanning direction is set to 3 times the dot dimension; further, the dots are arranged into a diagonal line in which adjacent dots of this line are offset from each other by one dot with respect to the sub scanning direction and by three dots with respect to the main scanning direction.

According to this arrangement, the dot pitch in the main scanning direction is still maintained above 2.5 times the dot dimension while the dot imaging intervals with respect to the sub scanning direction are reduced to one-dot intervals (high density). In this way, the shifting in the sub scanning direction for acquiring image signals of the reproduced image can be minimized so that the image signal acquisition operation can be performed more efficiently. Also, a dot line in the main scanning direction having a dot position deviation or a dot size deviation is accurately captured in the image signal acquisition process.

Figure 12:
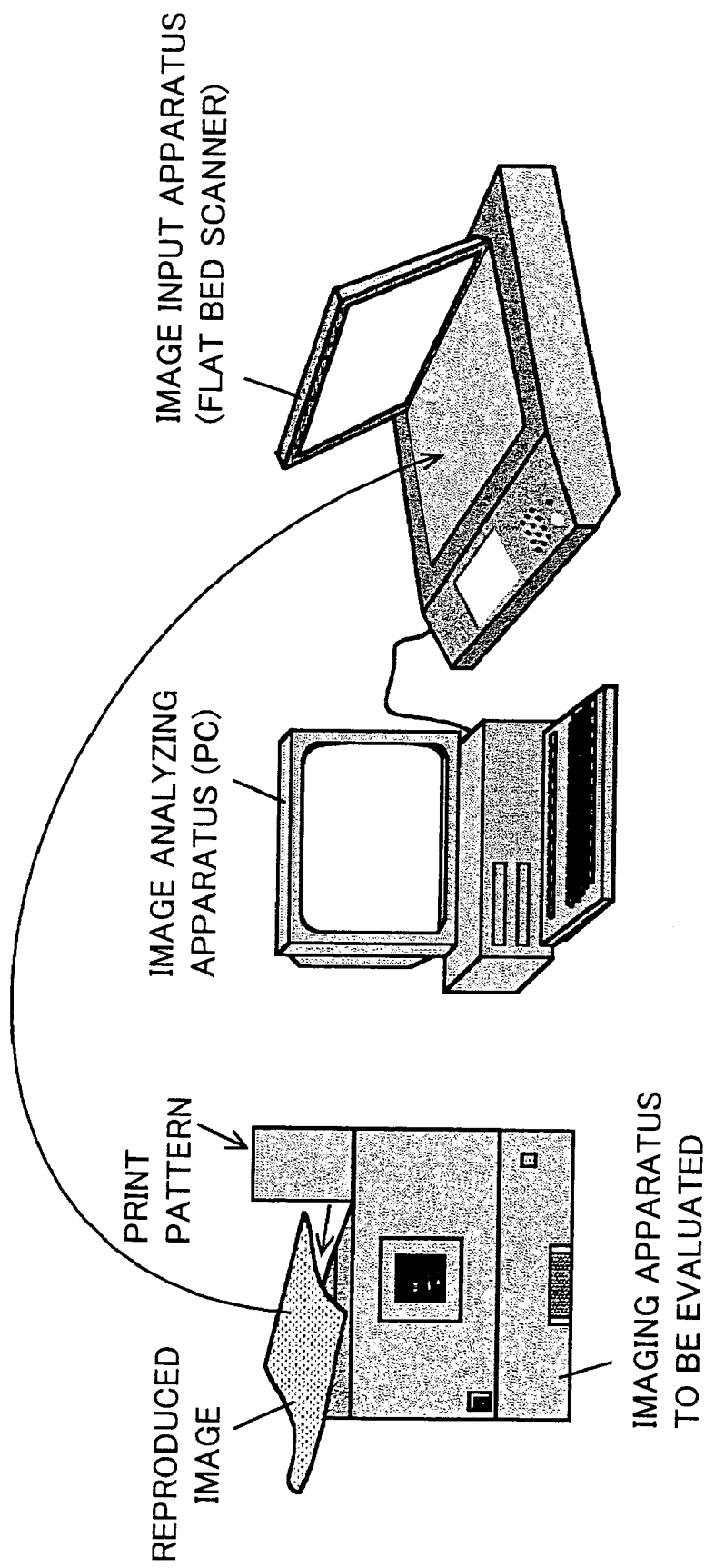
FIG. 12 shows an overall configuration of an image evaluation apparatus according to an embodiment of the present invention.
Figure 13:
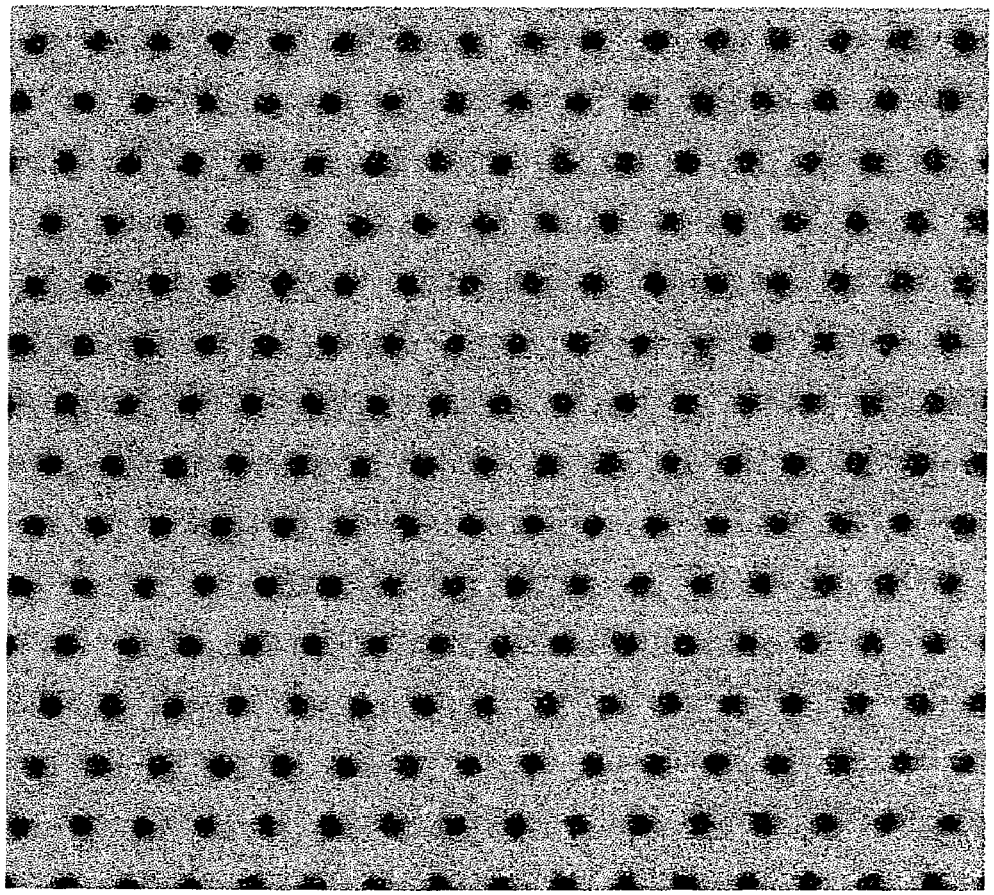
FIG. 13 shows an example of an output image generated using the print pattern of the image evaluation apparatus according to an embodiment of the present invention.

FIG. 12 illustrates an overall configuration of an image evaluation apparatus according to an embodiment of the present invention. In this drawing, the relationship between the imaging apparatus being measured and the reproduced image is shown. The image input apparatus shown in this example is a flat bed scanner; however, the present invention is not limited to this example, and a two dimensional CCD camera may be used instead, for example. The image data analyzing apparatus may be a personal computer, for example, and includes an image storage unit and an image signal computation unit. When the printed image is reproduced at a resolution of 84.6 μm, the image input apparatus needs to have a resolution of 42.3 μm or finer, and in the case of a scanner, the resolution needs to be at least 600 dpi. FIG. 13 shows an example of a scanned image of a reproduced image with a dot pitch of 2.5 times the dot dimension obtained using a scanner with a resolution of 2400 dpi.

By capturing the image using a scanner with a resolution of 2400 dpi, sending this image data as image signals to the image data analyzing apparatus, and analyzing the image using the image data analyzing apparatus, the dot position in the sub scanning direction of the imaging apparatus and the dot size of each dot may be calculated.

Figure 14:
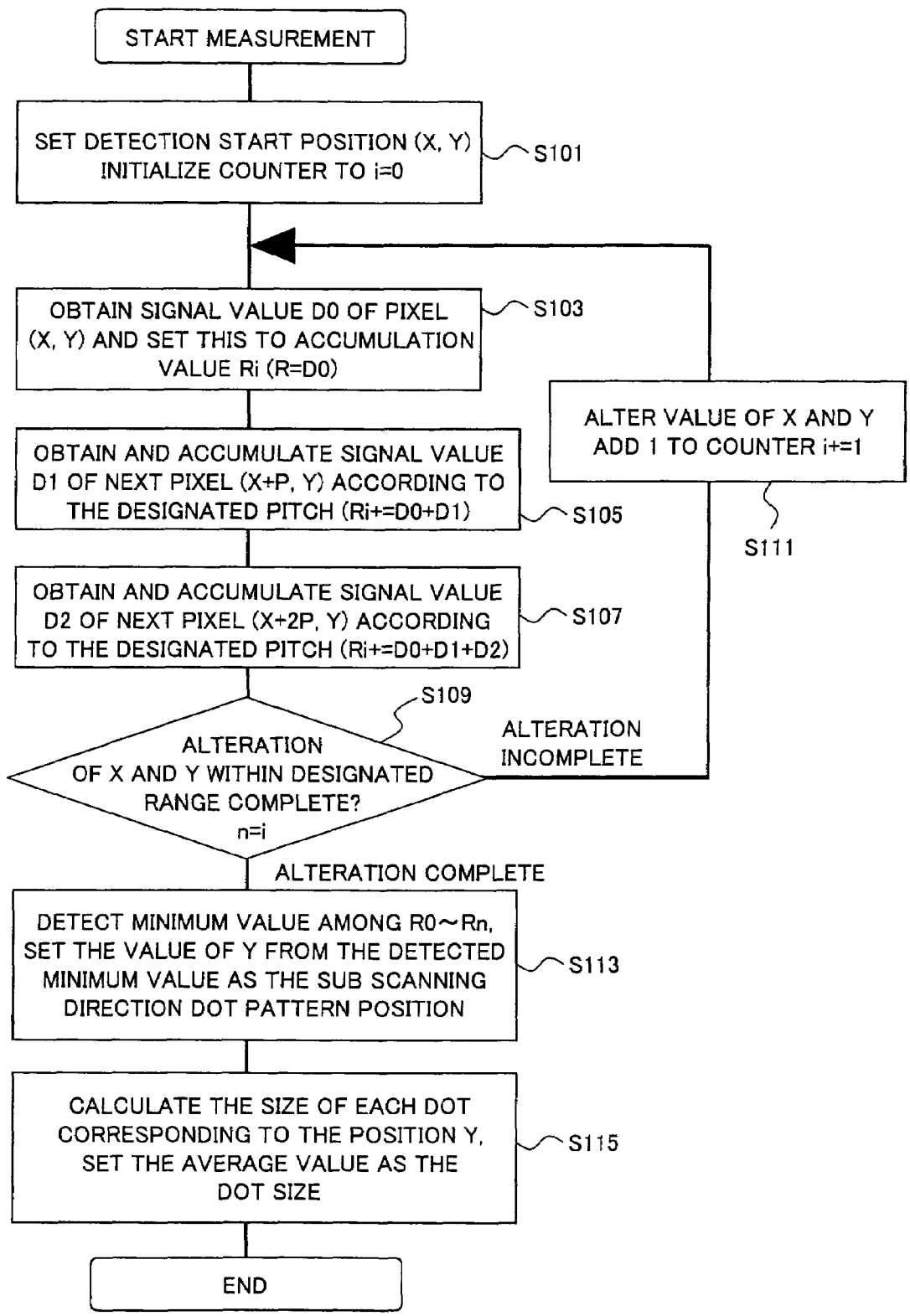
FIG. 14 is a flowchart of an image evaluation program according to an embodiment of the present invention.

FIG. 14 illustrates the flow of an image evaluation program according to an embodiment of the present invention;

namely, a calculation method of the dot positions in the sub scanning direction of the dots in a printed image for evaluating the dot position deviation in the sub scanning direction, in which method the dot positions are detected using a portion of the image containing a sequence of three dots aligned in the main scanning direction.

The basic concept of the flowchart shown in FIG. 14 is described below.

First, a dot detection start position is set, and image signal values of the dot detection start position and subsequent dot detection positions determined based on the designated dot pitch in the main scanning direction are detected and accumulated. After image signal values of a designated number of dot detection positions are accumulated, another dot detection start position that is shifted from the first dot detection start position is set and another accumulation value is obtained. This process of detecting and accumulating the image signals of a set of dot detection positions is successively performed within a designated portion of the image containing a line of dots arranged in the main scanning direction to obtain a plurality of accumulation values. Then, the obtained accumulation values are compared and a minimum accumulation value is detected from among the accumulation values of the sets of dot detection positions, and the dot detection positions with the minimum accumulation value are determined to be the dot positions.

Figure 15:
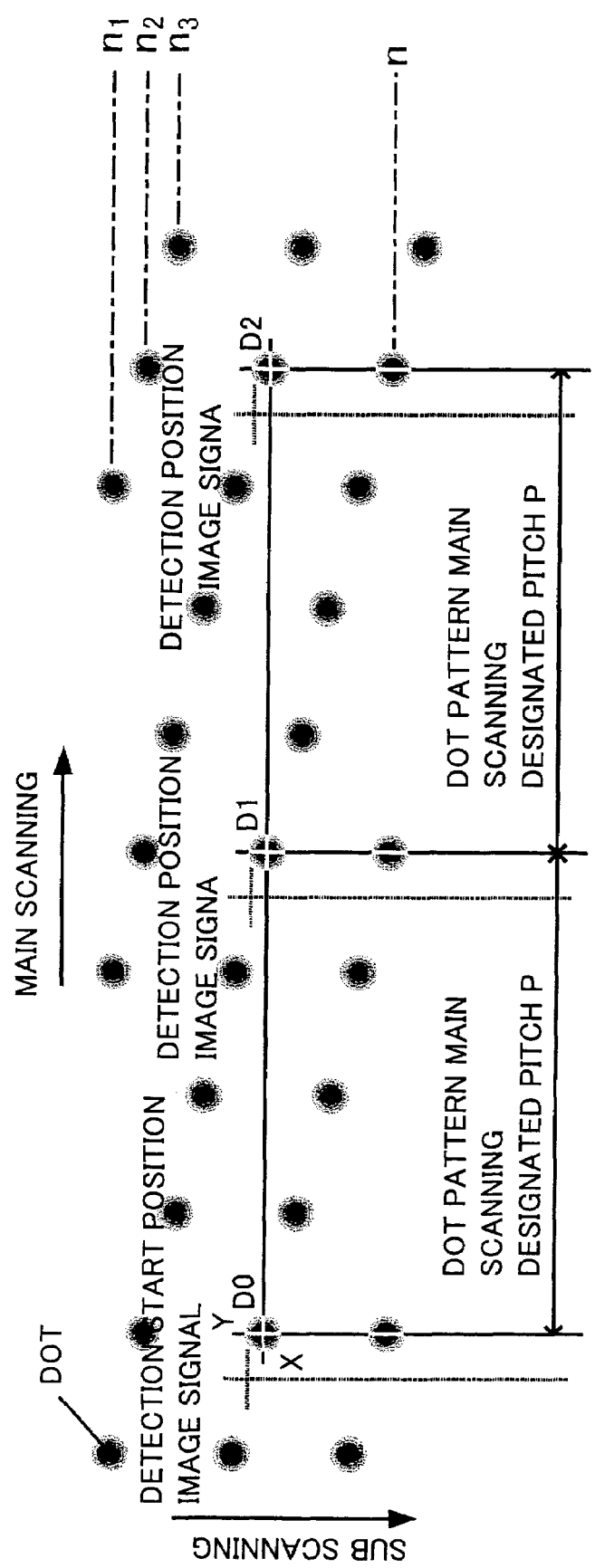
FIG. 15 is a conceptual image illustrating the image measurement process.

FIG. 15 illustrates the image measurement process for the image evaluation according to the flowchart of FIG. 14. In the dot image of FIG. 15, a dot line made up of three dots arranged in the main scanning direction is shown (D0, D1, and D2); further, dots of the image form diagonal lines in which adjacent dots are offset from each other by one dot with respect to the sub scanning direction and four dots with respect to the main scanning direction. Further, in this drawing, a line of three dots arranged in the main scanning direction are connected by a line. It is noted that the image signals generated for this image are 8 bit signals. Further, the image signal represents black by the value 0 and white by the value 255.

In this example, the image signals of three dot detection positions aligned in a main scanning direction at a dot pitch designated by the dot pattern (dot pattern main scanning designated pitch P in FIG. 15) are successively detected and accumulated. Specifically, a dot detection start position (first dot detection position) is set (S101 in FIG. 14) and an image signal value of this dot detection start position is obtained and accumulated (S103). Then, a next dot detection position (second dot detection position) spaced apart from the first dot detection position at the designated pitch P in the main scanning direction is determined and an image signal value of this dot detection position is detected and accumulated (S105). Then, a next dot detection position spaced apart from the second dot detection position at the designated pitch P in the main scanning direction is determined, and an image signal value of this dot detection position is detected and accumulated (S107). Further, the accumulation value of the image signal values of the three dot detection positions (i.e., D0+D1+D2 in FIG. 15) obtained in this measurement process is stored.

Then, the detection start position is successively shifted in the sub scanning direction and the main scanning direction, respectively (S111 in FIG. 14), to detect and accumulate image signal values of dot detection positions until an image signal value of each dot detection position within the designated portion of the image containing the three-dot line has been detected. Then, the accumulation values obtained from successively performing the measurement process of detecting and accumulating the image signal values are compared to determine a minimum accumulation value, and the coordinate value of the dot detection start position with which the minimum accumulation value has been obtained, specifically, the coordinate value Y corresponding to the sub scanning direction data, is determined to be the dot pattern position (the position of the dot line with respect to the sub scanning direction). By arranging the shifting range of the dot detection start position to be equivalent to the dot pitch in the main scanning direction and the dot pitch in the sub scanning direction of the dot pattern, a dot of an adjacent dot line (dot pattern) can be prevented from being mistakenly detected.

The number of dots collectively detected in the main scanning direction is three in this example. By this arrangement, measurement errors resulting from picking up dust particles as a part of the image can be prevented compared to a case in which only one or two dots are detected in one measurement process.

Then, the dot size can be calculated by obtaining the area of a dot by extracting and binarizing an image region corresponding to the dot at the detected dot position. The dot size may also be calculated by obtaining the diameter of the image region of the dot.

Figure 16:
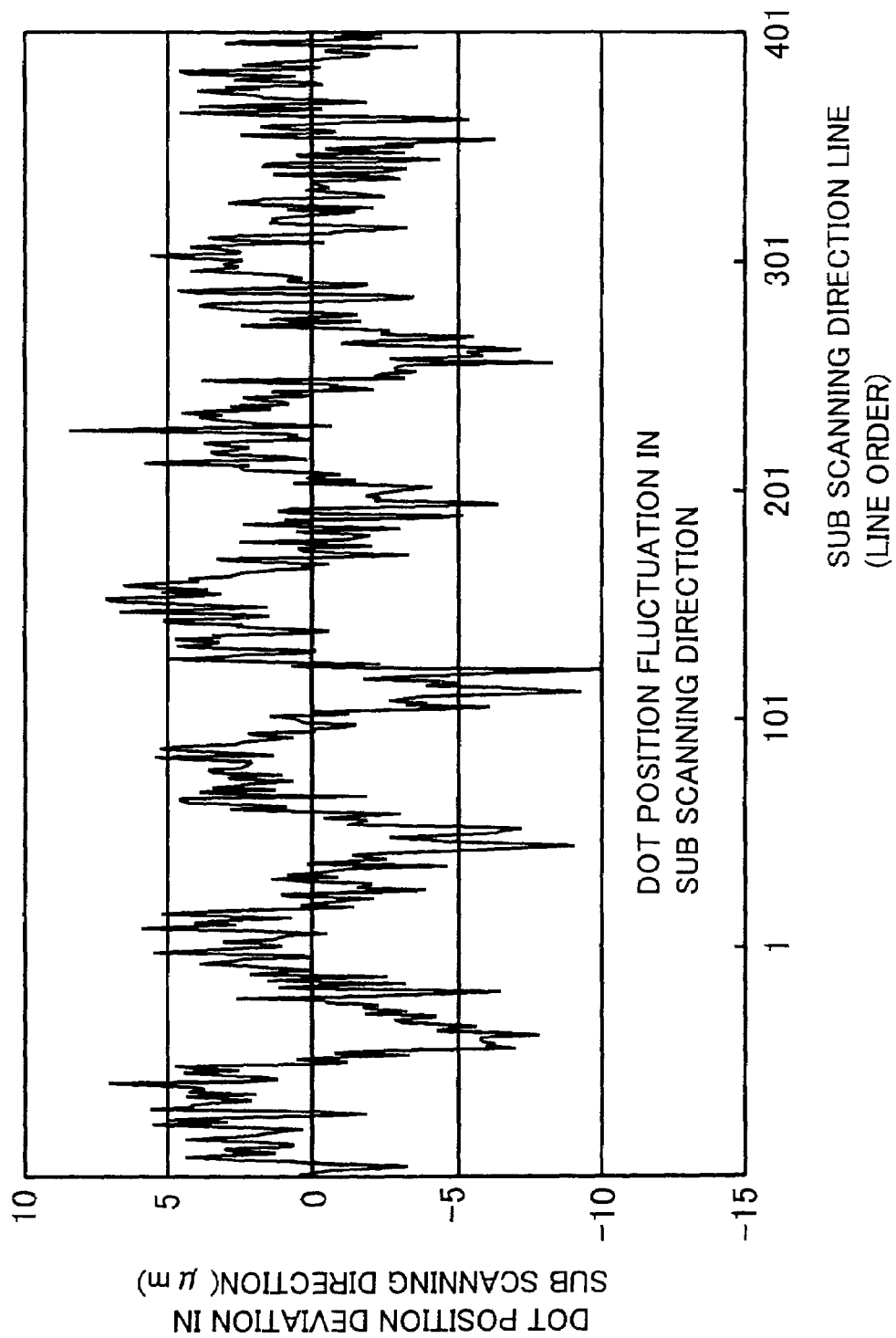
FIG. 16 is a graph showing the measurement results of a dot position deviation.
Figure 17:
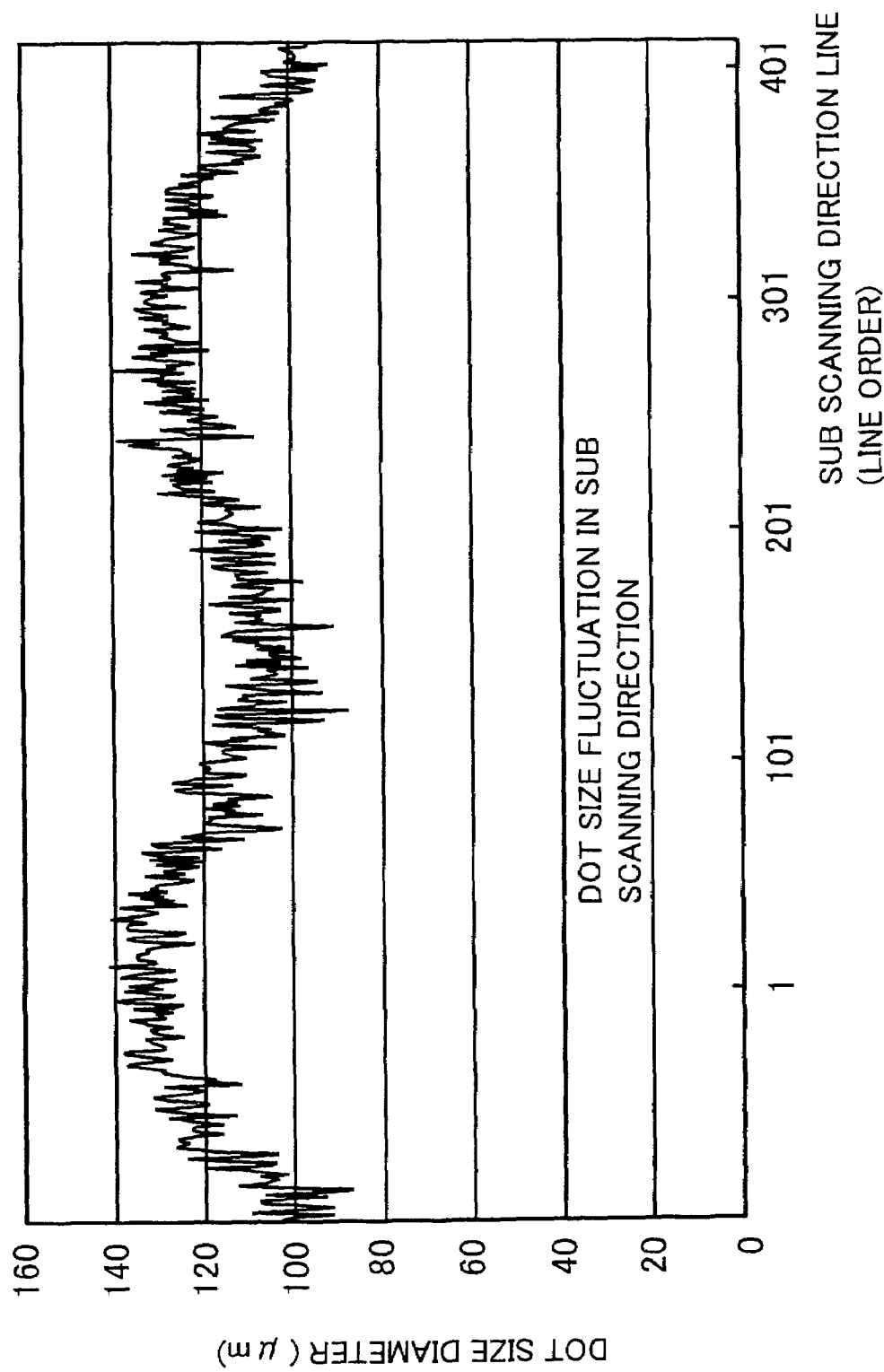
FIG. 17 is a graph showing the measurement results of a dot size fluctuation.

FIGS. 16 and 17 show the measurement results from measuring the above image.

In the graph of FIG. 16, the horizontal axis represents the line order n with respect to the sub scanning direction of a dot line of three dots aligned in the main scanning direction (see FIG. 15), and the vertical axis represents the dot position deviation in the sub scanning direction of the dot line of three dots aligned in the main scanning direction. In this example, the dot position fluctuates in cycles of approximately 80 dot lines and the amplitude on one side is approximately 5 μm.

Also, in the graph shown in FIG. 17, the horizontal axis represents the line order n with respect to the sub scanning direction of the dot line of three dots aligned in the main scanning direction, and the vertical axis represents the average dot size (dot diameter) of the three dots making up the dot line of each line. In this example, the dot size fluctuates in cycles of approximately 360 dot lines, and the amplitude on one side is approximately 20 μm.

In the image evaluation program of the present embodiment illustrated in FIG. 14, the dot detection position coordinates of the dot detection positions with the minimum accumulation value are detected by successively changing the dot detection start position at a fixed rate.

Figure 18:
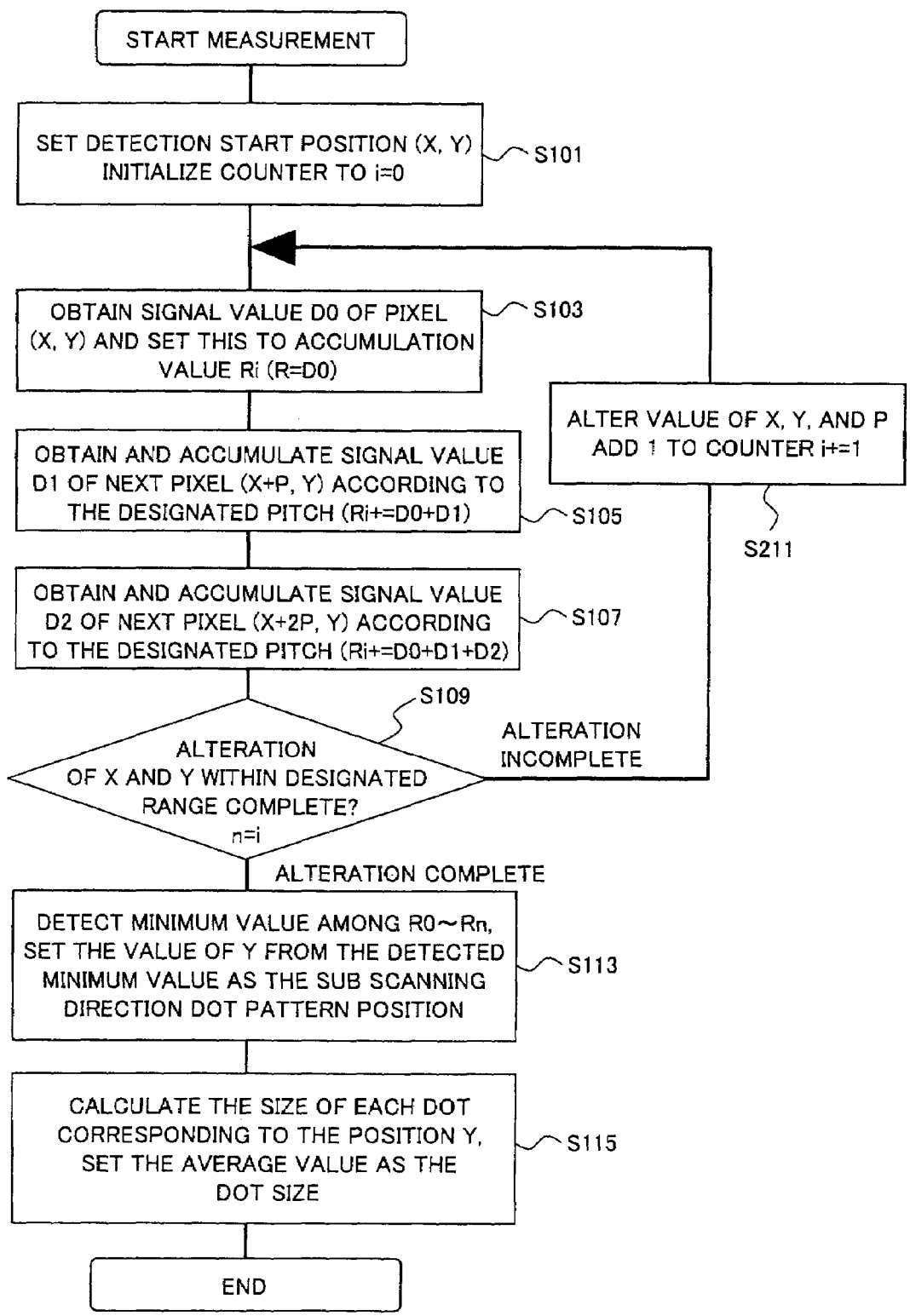
FIG. 18 is a flowchart of an image evaluation program according to another embodiment of the present invention.

FIG. 18 is a flowchart illustrating the flow of an image evaluation program for calculating the position of the dot line having three dots aligned in the main scanning direction according to a modified embodiment.

The basic concept of the flow of the image evaluation program shown in FIG. 18 is as follows.

In FIG. 18, P denotes a detection pitch, and the value P is varied within a fixed range based on the dot pitch designated by the dot pattern. Thus, in this image evaluation program, the detection pitch P is also altered in addition to the coordinate values X and Y (S211) that are successively altered in the measurement process shown in FIG. 14.

This image evaluation program is configured to eliminate the influences from image magnification errors in the main scanning direction generated by the imaging apparatus itself, and the expansion and contraction due to humidity, for example, of the support medium (for example, paper) supporting the reproduced image. It is noted that the main scanning magnification error range of the imaging apparatus itself is approximately 0.5%, and the error range from the expansion and contraction of the paper is 1%. Thus, if the dot pitch fluctuation is within a range of ±1.5%, the dot pitch is determined to be appropriate, and if the dot pitch fluctuation goes beyond this range, it is determined that the reproduced image is inappropriate.

Using the image evaluation program according to the flowchart of FIG. 18, the dot position of the first dot line in the main scanning direction is measured. Then, the corrected dot pitch with which the dot line position has been detected is recorded, and for the detection of the position of the next dot line and onward, the dot pitch is not altered, and instead, the recorded dot pitch obtained from the measurement of the first dot line is used in the subsequent measurement processes.

Figure 19:
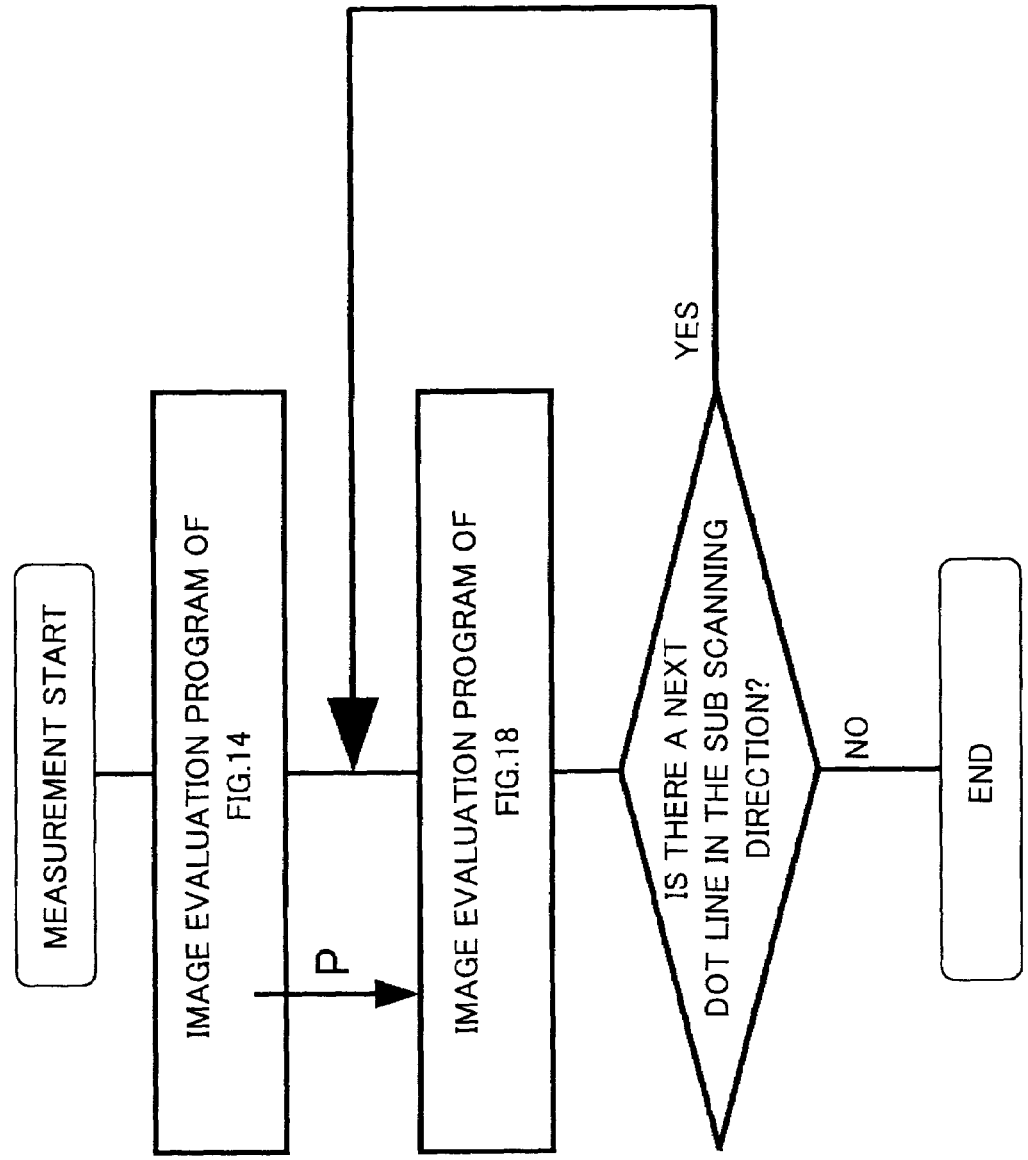
FIG. 19 is a flowchart of an image evaluation program according to another embodiment of the present invention.

FIG. 19 is a flowchart illustrating an image evaluation program implementing the programs of FIG. 14 and FIG. 18. The basic concept of the flow of this image evaluation process is as follows.

The program according to FIG. 18 is used only for the detection of the first dot line, and the corrected detection pitch P obtained in this detection of the first dot line is used to detect the subsequent dot line positions according to the program of FIG. 14.

The dot pitch error in the main scanning direction measured in the image evaluation program of FIG. 18 is regarded as a dot pitch error occurring consistently throughout the entire image support medium of the reproduced image. This is because image magnification errors in the main scanning direction generated by the imaging apparatus and the expansion and contraction due to humidity, for example, of the paper (image support medium) both occur consistently throughout the entire image rather than on one spot. Thus, according to the image evaluation program of FIG. 19, accuracy with respect to the main scanning direction dot pitch can be maintained while the calculation time required for the dot pitch correction can be significantly reduced.

Figure 20:
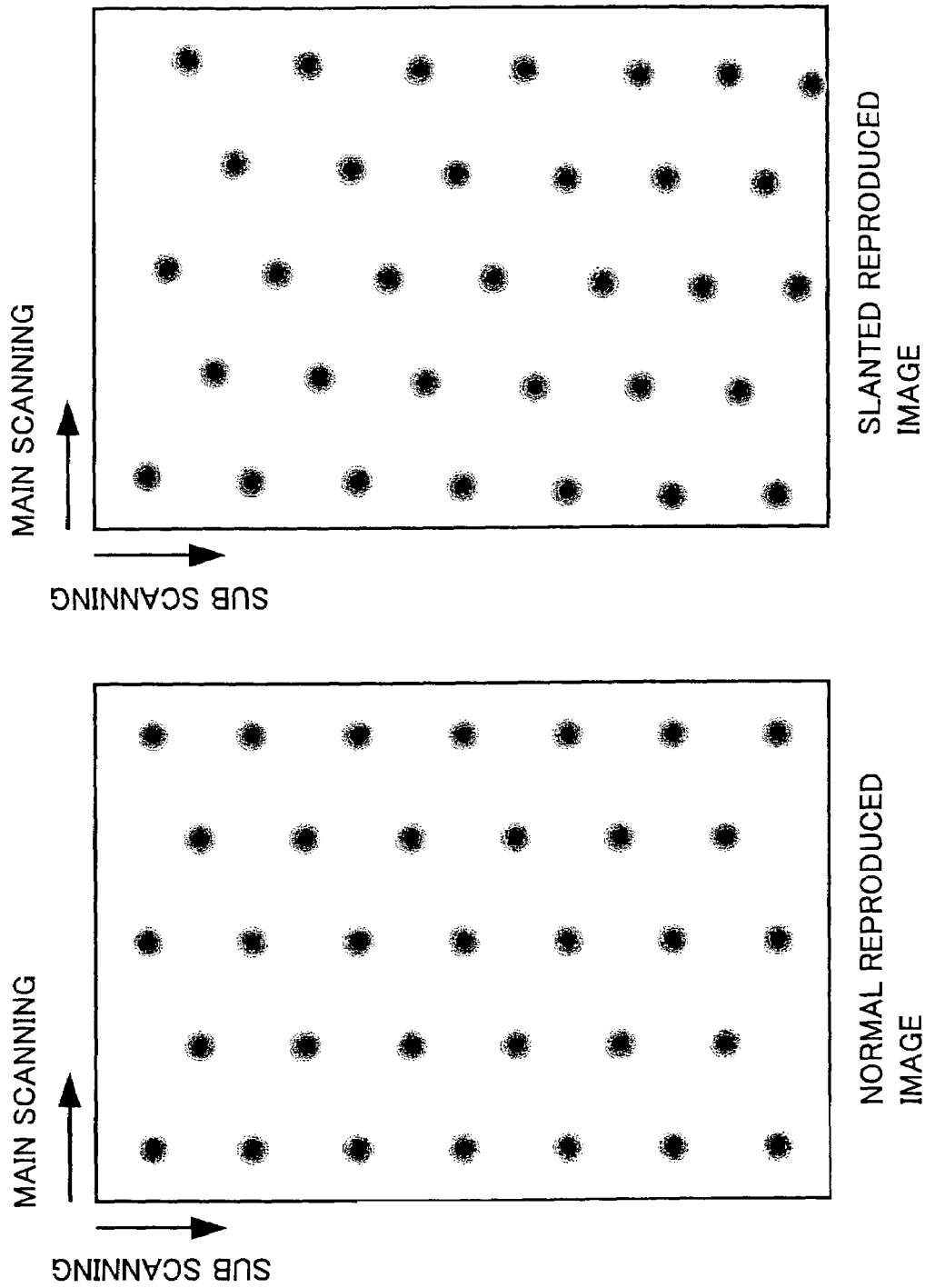
FIG. 20 shows an example of a skewed image generated by an imaging apparatus according to an embodiment of the present invention.

An image evaluation program according to another modified embodiment is configured to counter the problem concerning reproduced images with imaged dots that are slanted (skewed) as shown in FIG. 20. According to this embodiment, in detecting the main scanning direction dot line, the dot pitch in the main scanning direction is maintained at the same pitch while the scanning direction for measuring the dot line is slanted toward the sub scanning direction, this change being made within a predetermined range. In this way, the dot pitch in the main scanning direction and the dot pitch in the sub scanning direction in the reproduced image can be accurately detected.

Figure 21:
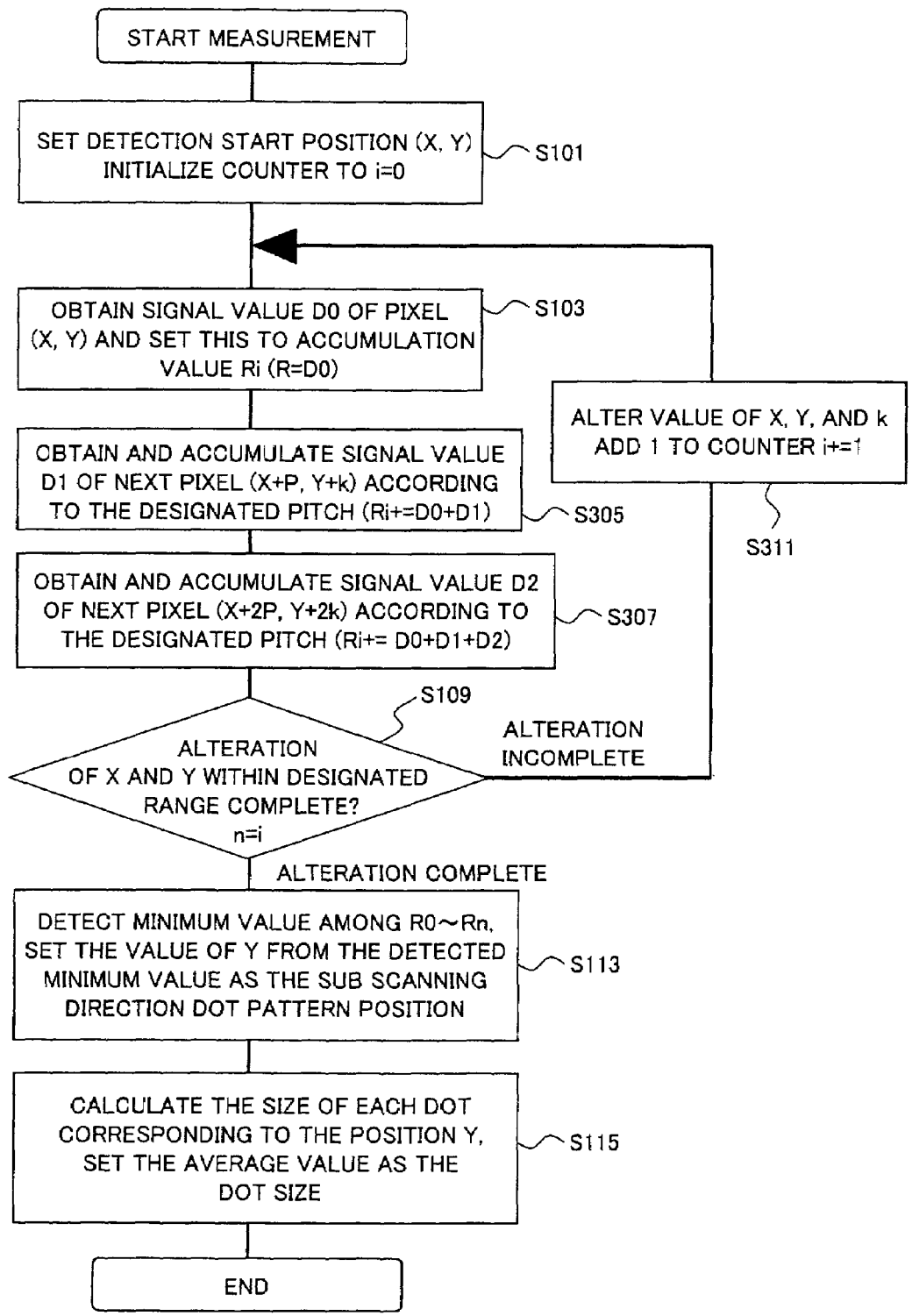
FIG. 21 is a flowchart of an image evaluation program according to another embodiment of the present invention.

FIG. 21 is a flowchart illustrating an image evaluation program for calculating the position of the dot line of three dots aligned in the main scanning direction according to the above described embodiment.

In FIG. 21, K denotes the slanting coefficient of the dot line in the main scanning direction. In the dot pattern, the dot lines in the main scanning direction are parallel to the main scanning direction; therefore, K is changed within a fixed range with 0 as the median value. Thus, according to FIG. 21, the slanting coefficient K is also altered in addition to the coordinate values X and Y (S311) that are successively altered in the image evaluation program of FIG. 14. Specifically, the image signal value of a designated dot detection start position is detected and accumulated in the manner identical to the process of FIGS. 14 and 18 (S103), and then, the next two dot detection positions are determined based on the designated dot detection start position, the predetermined pitch, and the designated slanting coefficient, after which the image signal values of the dot detection positions are detected and accumulated (S305 and S307). Then, the dot detection positions with the minimum image signal accumulation value from among the detected accumulation values obtained by varying the value of K within a fixed range is determined to be the dot positions. By varying the value of K, an accumulation value of a set of dot detection positions exactly corresponding to the center positions of all three dots can be obtained, thereby enabling accurate dot position detection.

Figure 22:
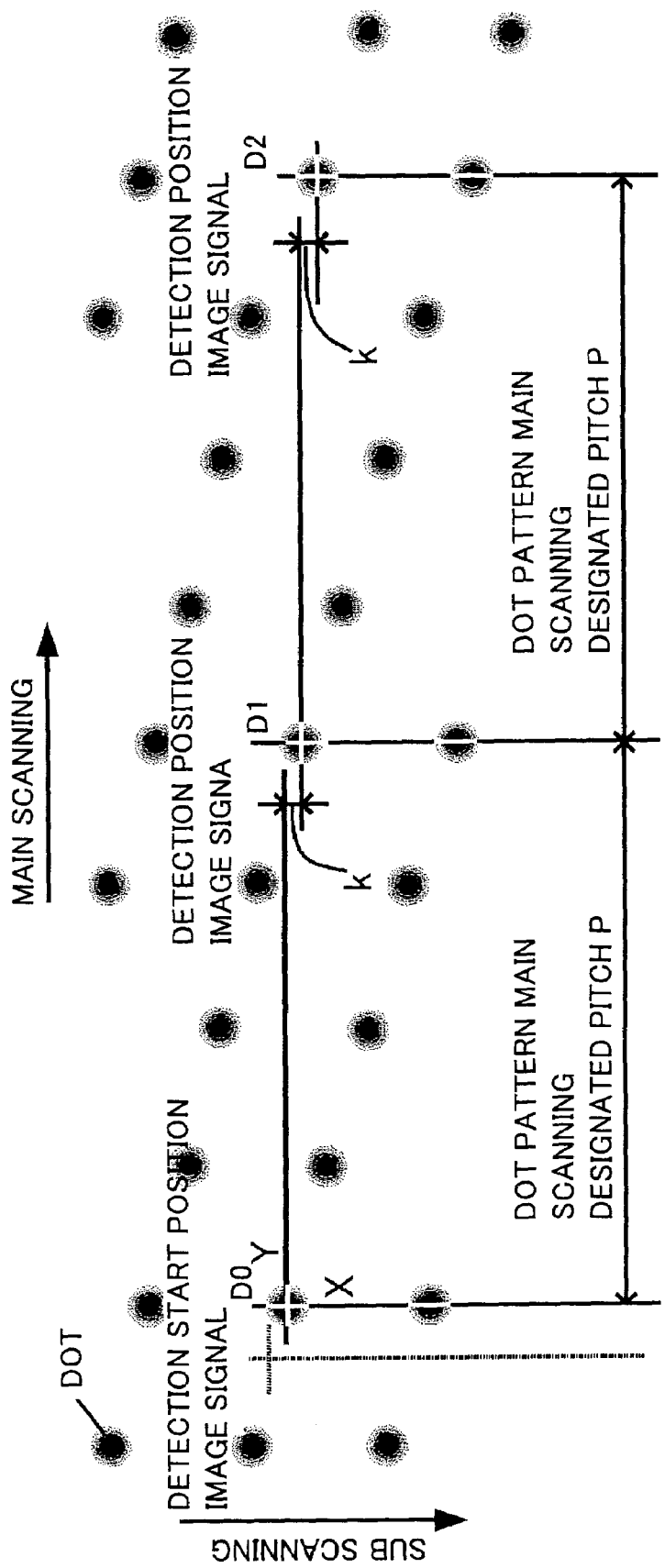
FIG. 22 is a conceptual image of the image measurement process in accordance with the flowchart of FIG. 21.

FIG. 22 illustrates the image measurement process according to the flowchart of FIG. 21. The image shown in this drawing has dot lines (dot patterns) that are slanted. The dot pitch error in the sub scanning direction is either caused by the image reproduction error of the imaging apparatus itself, or the slanting occurring upon setting the reproduced image to the image input apparatus. The slanting of the reproduced image is a characteristic that is standardized, and generally, the reproduction error range is approximately $1/200$. Also, the error range in setting the reproduced image to the image input apparatus is approximately $1/100$. Accordingly, a dot pitch that is calculated to be within an error range of $3/200$ is determined to be appropriate in the present embodiment.

FIG. 23A is a flowchart of an image evaluation program according to an embodiment of the present invention illustrating the process of measuring the dot size of each dot of which a dot position has been measured according to the processes described in FIGS. 14-22. Also, FIG. 23B shows processed images describing the program flow of FIG. 23A. The basic concept of the image evaluation program flow is as follows.

The areas surrounding the dot correspond to the support medium surrounding the dot, and in this regard, the surrounding areas all have the same reflection rate. If this surrounding area data changes for each dot, it can be assumed that this is due to the unevenness in the dot density reading by the image input apparatus. Thus, the main object of this program is to correct the density level of the dot image using the surrounding area data.

First, a region containing the dot with the dot position at the center is extracted from the image data (S401), and the average of the image signal levels of the support medium (paper) surrounding the imaged dot, which corresponds to the surrounding area data of the image region, is calculated (S403). Then, the dot size is calculated by successively subtracting an image signal value of the extracted image region from the average value of the surrounding area data for each signal value of the extracted image region and accumulating the resulting values (S405 and S407). In measuring the dot size through binarization, measurement can be realized using the image signal resolution so that the measurement performance is degraded. In response, by adding intermediate data; namely, 8 bit image signal data, a highly precise measurement can be realized. However, upon adding this multi-level data, the brightness of the image read by the image input apparatus may be inconsistent due to the unevenness of the irradiation light emitted from the irradiation system implemented in this image input apparatus or the lens aberration. In the image evaluation program according to the present invention, the average image signal level of the support medium surrounding the imaged dot is calculated, and thereby, the influences from the irradiation light or lens aberration can be eliminated.

Figure 24:
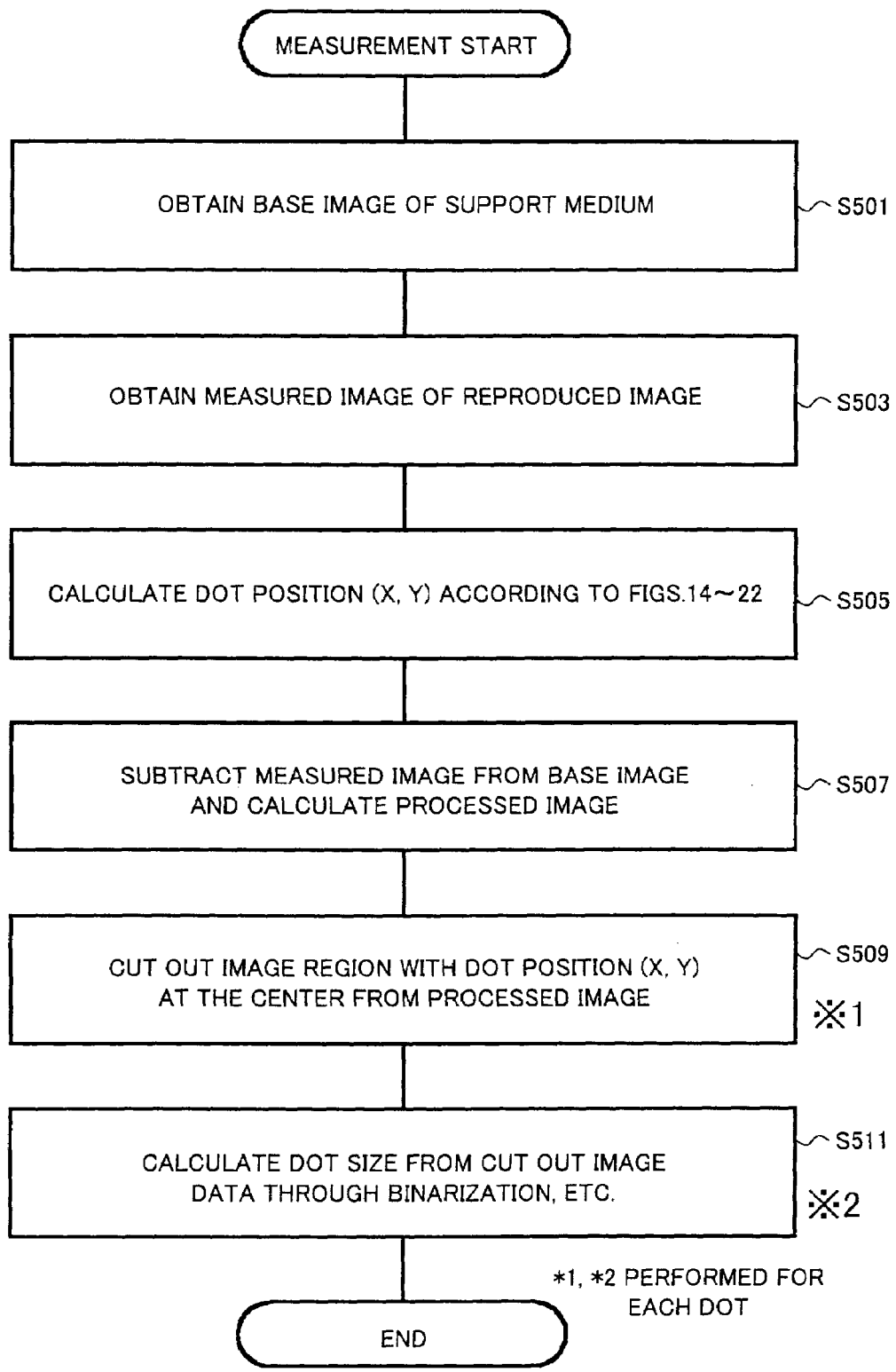
FIG. 24 is a flowchart of an image evaluation program according to another embodiment of the present invention.

FIG. 24 is a flowchart illustrating the image evaluation program flow for detecting the dot size of each dot according to another embodiment. The image evaluation program of FIG. 24 represents an algorithm for detecting the dot size in which a basic image obtained by reading a consistent white colored image is used to correct the unevenness in the dot density reading of the image input apparatus.

The image signal being subjected in this image evaluation program is the 8 bit data.

Figure 25:
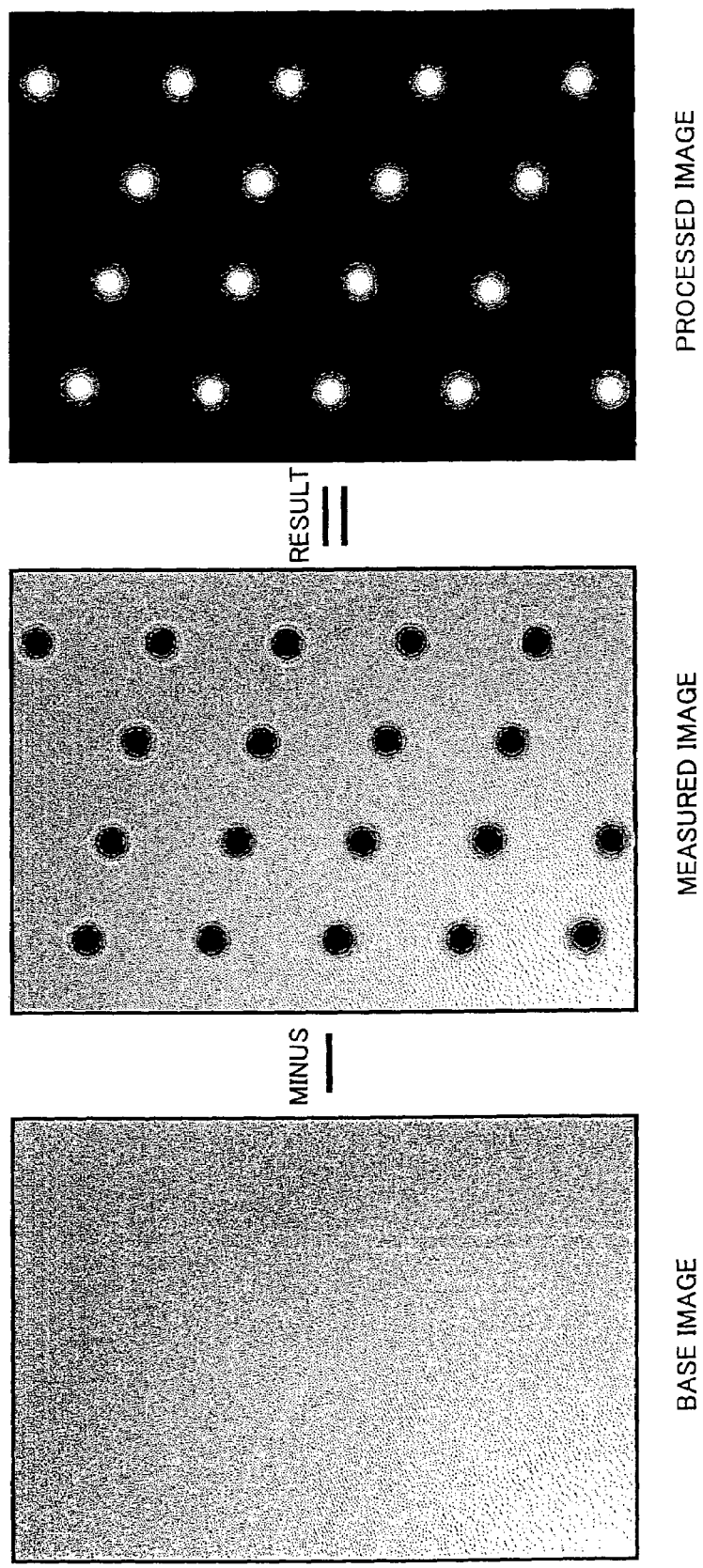
FIG. 25 shows an example of an image computation according to the flowchart of FIG. 24.

Image signal data of the support medium, in a state prior to having the reproduced image containing the dot pattern formed thereon (base image in FIG. 25), is obtained in advance using the image input apparatus and this data is stored (S501 in FIG. 24). Then, the reproduced image containing dots is input to the image input apparatus to obtain image signal data of the reproduced image (measured image in FIG. 25, S503 in FIG. 24), and an image to be evaluated (processed image in FIG. 25) is obtained by subtracting the reproduced image signal data (measured image) from the support medium image signal data (base image) (S507 in FIG. 24). Since the resulting processed image is obtained from subtracting the reproduced image signal data (measured image) from the image signal data of the support medium (base image), this image data is not influenced by the unevenness in dot density reading of the image input apparatus. Therefore, the signal intensity of this processed image is determined solely by the density of the dots.

Figure 23:
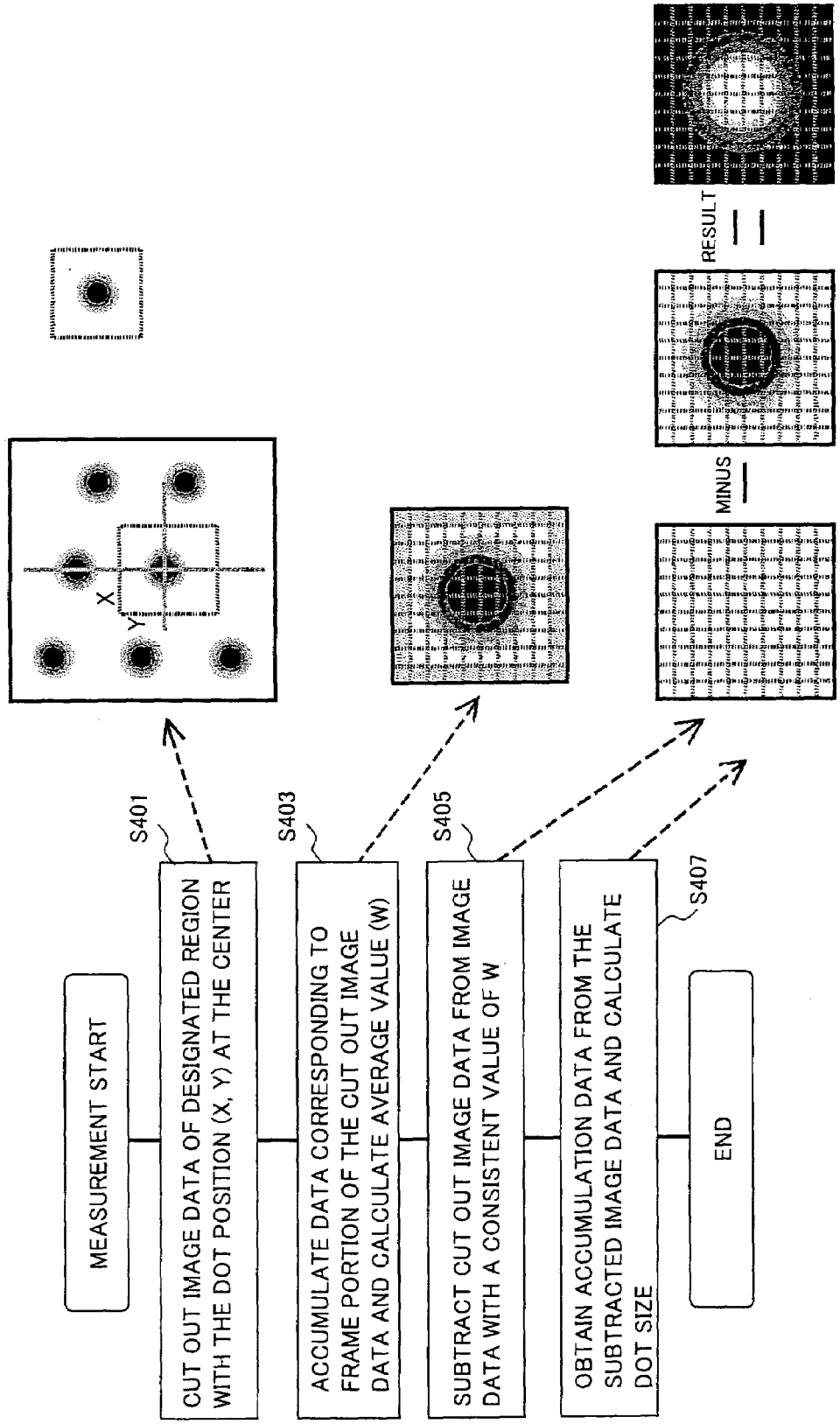
FIG. 23 is a flowchart of an image evaluation program according to another embodiment of the present invention.

Then, each image region containing a dot is extracted from the processed image based on the detected dot position (S509 in FIG. 24), and the dot size of each dot is calculated in the manner identical to the dot size calculation method of FIG. 23 (S511 in FIG. 24). According to the present embodiment, to counter the effects of inconsistency in the brightness of the image being read due to the unevenness of the light irradiated by the irradiation system implemented in the image input apparatus or the lens aberration, the image signal level of the support medium (paper) is obtained beforehand and this data is subtracted from the measured dot pattern data so that influences from these effects can be eliminated.

Also, a recording medium that stores the image evaluation programs described above according to an embodiment of the present invention may be, for example, a hard disk or a CD-ROM storing the image evaluation programs of the present invention.

In the following, the advantages of the present invention are described.

First, since the reproduced image used in the present invention is formed by a dot pattern with a dot pitch of at least 2.5 times the dot dimension, influences from dot position deviation due to a variation in dot configuration or dot size that is caused by a difference in the space between the imaged dots can be eliminated so that the dot position deviation in the sub scanning direction and the dot size variation can be accurately measured. In this away, it can be accurately determined whether the imaging apparatus outputting the reproduced image being examined meets necessary requirements or is defective.

Further, in the reproduced image used in the present invention, sufficient distance is maintained between the imaged dots while sufficient dot density in the sub scanning direction is also achieved. Thereby, influences from dot position deviation due to a variation in dot configuration or dot size that is caused by a difference in the distance between the imaged dots can be eliminated so that the dot position deviation in the sub scanning direction and the dot size variation can be accurately measured. In this away, it can be accurately determined whether the imaging apparatus outputting the reproduced image being examined meets necessary requirements or is defective.

Also, the image evaluation apparatus implementing an image evaluation program according to the present invention measures a dot position using a dot line containing a plurality of dots aligned in the main scanning direction so that influences from dust particles that do not correspond to the appropriate dot pitch can be eliminated. In this way, the dot position can be accurately measured in a short period of time, and it can be accurately determined whether the imaging apparatus outputting the reproduced image being examined meets necessary requirements or is defective.

Further, the image evaluation apparatus implementing an image evaluation program according to the present invention measures a dot position by varying the dot pitch in the main scanning direction within a fixed range so that influences from the expansion and contraction of paper, for example, used as the image supporting medium or influences from the imaging magnification error generated by the imaging apparatus itself, can be eliminated. In this way, the dot position can be accurately measured, and it can be accurately determined whether the imaging apparatus outputting the reproduced image being examined meets necessary requirements or is defective.

Further, the image evaluation apparatus implementing an image evaluation program according to the present invention determines the dot pitch in the main scanning direction upon measuring the dot position of the first line, and uses this value for measuring the subsequent lines. Thus, influences from the expansion and contraction of the paper used as the image supporting medium or influences from the imaging magnification error generated by the imaging apparatus itself can be eliminated. Also, since computation requirements are not greatly increased, the dot position measurement can be performed in a short period of time, and it can be accurately determined whether the imaging apparatus outputting the reproduced image being examined meets necessary requirements or is defective.

Further, the image evaluation apparatus implementing an image evaluation program according to the present invention measures a dot line position by varying the slanting degree of the dot line in the main scanning direction within a fixed range while maintaining the dot pitch at a same value. Thus, the dot position can be measured without influences from skews caused by the imaging apparatus itself or influences from slanting generated upon setting the reproduced image to the image input apparatus. In this way, it can be accurately determined whether the imaging apparatus outputting the reproduced image being examined meets necessary requirements or is defective.

Also, the image evaluation apparatus implementing an image evaluation program according to the present invention calculates the average image signal level of the support medium image data of the reproduced image based on the image signals of surrounding areas of the imaged dot. Thus, influences from unevenness in the brightness of the input image corresponding to the reproduced image read by the image input apparatus can be eliminated, and the dot size fluctuation in the sub scanning direction can be accurately measured. In this way, it can be accurately determined whether the imaging apparatus outputting the reproduced image being examined meets necessary requirements or is defective.

Alternatively, the image evaluation apparatus implementing an image evaluation program according to the present invention may have the image signal data corresponding to the support medium of the reproduced image stored in advance. In this case, the image signal of the reproduced image is subtracted from the image signal of the support medium. Thus, the dot size fluctuation in the sub scanning direction can be accurately measured without influences from unevenness in the brightness of the input image corresponding to the reproduced image read by the image input apparatus, and it can be accurately determined whether the imaging apparatus outputting the reproduced image being examined meets necessary requirements or is defective.

Additionally, the image evaluation apparatus implementing a program that is stored in a storage medium according to the present invention is able to accurately measure a dot deviation and a dot size fluctuation in the sub scanning direction. Thereby, it can be accurately determined whether the imaging apparatus outputting the reproduced image being examined meets necessary requirements or is defective.

The present application is based on and claims the benefit of the earlier filing date of Japanese priority application No.2002-207565 filed on Jul. 16, 2002, the entire contents of which are hereby incorporated by reference.

What is claimed is:

1. An image evaluation method implemented in an image evaluation apparatus, comprising:
    evaluating a dot of an image that is reproduced on a support medium by an imaging apparatus and formed by a plurality of dots having a predetermined dimension arranged in a main scanning direction and a sub scanning direction, said image evaluation apparatus producing image signals at a resolution at least twice as high as a dot resolution of the image;
    measuring a dot position of each dot in the image;
    obtaining image signals of a portion of the image reproduced by the imaging apparatus, said portion of the image containing a dot line of at least three dots arranged in the main scanning direction;
    setting a dot detection start position within the portion of the image, detecting an image signal value of said dot detection start position, and accumulating the detected image signal value of the dot detection start position;
    successively determining a next dot detection position within the portion of the image based on the dot detection start position and the predetermined pitch in the main scanning direction, detecting the image signal value of the next dot detection position, and accumulating the detected image signal value of the next dot detection position;
    calculating an accumulation value of the detected image signal values of the dot detection start position and the next dot detection position;
    successively shifting the dot detection start position within the portion of the image and repeating the steps of detecting and accumulating the image signal value of the dot detection start position, determining the next dot detection position, detecting and accumulating the image signal value of the next dot detection position, and calculating the accumulation value to obtain a plurality of accumulation values;
    comparing the plurality of accumulation values and detecting a minimum accumulation value; and
    determining the dot positions of the dot line contained in the portion of the image based on the dot detection positions of which the accumulation value corresponds to the minimum accumulation value.

2. The image evaluation method as claimed in claim 1, further including evaluating a dot size variation in the image by measuring a dot size of each dot in the image.

3. The image evaluation method as claimed in claim 1, wherein the image produced by the imaging apparatus is formed by a plurality of dots in a diagonal line such that adjacent dots of the diagonal line are offset from each other by at least one dot in the sub scanning direction.

4. An image evaluation apparatus, comprising:
    evaluating unit configured to evaluate a dot of an image that is reproduced on a support medium by an imaging apparatus and formed by a plurality of dots having a predetermined dimension arranged in a main scanning direction and a sub scanning direction;
    a producing unit configured to produce image signals at a resolution at least twice as high as a dot resolution of the image;
    a measuring unit configured to measure a dot position of each dot in the image;
    an obtaining unit configured to obtain image signals of a portion of the image reproduced by the imaging apparatus, said portion of the image containing a dot line of at least three dots arranged in the main scanning direction;
    a setting unit configured to set a dot detection start position within the portion of the image, to detect an image signal value of said dot detection start position, and to accumulate the detected image signal value of the dot detection start position;
    a determining unit configured to successively determine a next dot detection position within the portion of the image based on the dot detection start position and the predetermined pitch in the main scanning direction, to detect the image signal value of the next dot detection position, and to accumulate the detected image signal value of the next dot detection position;
    a calculating unit configured to calculate an accumulation value of the detected image signal values of the dot detection start position and the next dot detection position;
    a shifting unit configured to successively shift the dot detection start position within the portion of the image, to cause said determining unit to repeat the detection and accumulation of the image signal value of the dot detection start position, to determine the next dot detection position, to detect and accumulate the image signal value of the next dot detection position, and to calculate the accumulation value to obtain a plurality of accumulation values;
    a comparing unit configured to compare the plurality of accumulation values and to detect a minimum accumulation value; and
    the determining unit is configured to determine the dot positions of the dot line contained in the portion of the image based on the dot detection positions of which the accumulation value corresponds to the minimum accumulation value.

5. A computer readable medium storing a image evaluation computer program implemented in an image evaluation apparatus to evaluate a dot of an image that is reproduced on a support medium by means of an imaging apparatus and formed by a plurality of dots having a predetermined dimension arranged in a main scanning direction and a sub scanning direction, said image evaluation apparatus producing image signals at a resolution at least twice as high as a dot resolution of the image, and said image evaluation computer program being arranged to measure a dot position of each dot in the image, the image evaluation computer program comprising instructions to execute the steps of:

obtaining image signals of a portion of the image reproduced by the imaging apparatus, said portion of the image containing a dot line of at least three dots arranged in the main scanning direction;

setting a dot detection start position within the portion of the image, detecting an image signal value of said dot detection start position, and accumulating the detected image signal value of the dot detection start position;

successively determining a next dot detection position within the portion of the image based on the dot detection start position and the predetermined pitch in the main scanning direction, detecting the image signal value of the next dot detection position, and accumulating the detected image signal value of the next dot detection position;

calculating an accumulation value of the detected image signal values of the dot detection start position and the next dot detection position;

successively shifting the dot detection start position within the portion of the image and repeating the steps of detecting and accumulating the image signal value of the dot detection start position, determining the next dot detection position, detecting and accumulating the image signal value of the next dot detection position, and calculating the accumulation value to obtain a plurality of accumulation values;

comparing the plurality of accumulation values and detecting a minimum accumulation value; and determining the dot positions of the dot line contained in the portion of the image based on the dot detection positions of which the accumulation value corresponds to the minimum accumulation value.

6. The computer readable medium as claimed in claim 5, further comprising an instruction for:

repeating the steps of obtaining image signals of a next portion of the image that is adjacent to the portion that has just been measured with respect to the sub scanning direction, and determining the dot positions of the dot line contained in the portion of the image to obtain the dot position of each dot in the image.

7. The computer readable medium as claimed in claim 5, wherein:

the predetermined pitch in the main scanning direction, used in the dot position detection of the dot line, is varied within a predetermined range, and the dot positions of the dot line contained in the portion of the image are determined based on the dot detection positions of which the accumulation value corresponds to the minimum accumulation value from among the accumulation values obtained using the various pitches.

8. The computer readable medium as claimed in claim 7, wherein:

the dot pitch that has been used to determine the dot detection positions of which the accumulation value corresponds to the minimum accumulation value is used in a subsequent dot position detection of the dot line in the portion of the image next in line with respect to the sub scanning direction.

9. The computer readable medium as claimed in claim 5, wherein:

a slope of a dot detection base line extending in the main scanning direction on which the dot detection positions are aligned at the predetermined pitch in the main scanning direction, used in the dot position detection of the dot line, is varied within a predetermined range while the predetermined pitch in the main scanning direction is maintained at the same pitch, and the dot positions of the dot line are determined based on the dot detection positions of which the accumulation value corresponds to the minimum accumulation value from among the accumulation values obtained using the dot detection base lines with the various slopes.

10. The computer readable medium as claimed in claim 5, further comprising instructions to execute the steps of:

obtaining image signals of a region of the image adequately containing a dot being measured in the image based on the detected dot position of said dot;

calculating an average value of the image signals corresponding to surrounding areas of the dot being measured that is within the region of the image; and determining a dot size of the dot being measured by successively calculating and accumulating a difference between an image signal value within the region of the image and the average value of the surrounding areas of the dot being measured for each of the image signal values contained in the region of the image.

11. The computer readable medium as claimed in claim 5, further comprising the steps of:

obtaining image signals of the support medium in a state prior to having the dots of the image reproduced by the imaging apparatus and storing the image signals of the support medium;

obtaining image signals of the image with the dots reproduced on the support medium by the imaging apparatus;

calculating a difference between the image signals of the reproduced image and the image signals of the support medium to obtain a processed image; and determining a dot size of a dot being measured in the image by accumulating image signals of a region of the processed image adequately containing the dot being measured, said region of the processed image being obtained based on the detected dot position of the dot being measured.

* * * * *